United States Patent
Zhu et al.

(10) Patent No.: US 10,869,044 B2
(45) Date of Patent: Dec. 15, 2020

(54) IMAGE PROCESSING METHOD AND DEVICE

(71) Applicant: SZ DJI TECHNOLOGY CO., LTD., Shenzhen (CN)

(72) Inventors: Lei Zhu, Shenzhen (CN); Ming Gong, Shenzhen (CN); Ning Ma, Shenzhen (CN); Wei Fan, Shenzhen (CN); Hao Cui, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/455,283

(22) Filed: Jun. 27, 2019

(65) Prior Publication Data
US 2019/0320184 A1    Oct. 17, 2019

Related U.S. Application Data

(63) Continuation of application No. PCT/CN2016/113944, filed on Dec. 30, 2016.

(51) Int. Cl.
*H04N 19/166*    (2014.01)
*H04N 19/159*    (2014.01)
*H04N 19/17*    (2014.01)

(52) U.S. Cl.
CPC ......... *H04N 19/166* (2014.11); *H04N 19/159* (2014.11); *H04N 19/17* (2014.11)

(58) Field of Classification Search
CPC .................................................. H04N 19/166
See application file for complete search history.

(56) References Cited

U.S. PATENT DOCUMENTS

| | | |
|---|---|---|
| 8,971,415 B2 | 3/2015 | He |
| 9,071,484 B1 | 6/2015 | Truax |
| 9,106,936 B2 | 8/2015 | Wegener |
| 9,338,473 B2 | 5/2016 | Zhao et al. |
| 9,584,832 B2 | 2/2017 | Corey |

(Continued)

FOREIGN PATENT DOCUMENTS

| | | |
|---|---|---|
| CN | 1115045 A | 1/1996 |
| CN | 101155311 A | 4/2008 |

(Continued)

OTHER PUBLICATIONS

World Intellectual Property Organization (WIPO) International Search Report for PCT/CN2016/113944 dated Sep. 27, 2017 5 pages.

(Continued)

*Primary Examiner* — Irfan Habib
(74) *Attorney, Agent, or Firm* — Anova Law Group, PLLC

(57) ABSTRACT

An image processing method includes a transmitting terminal receiving a feedback message sent by a receiving terminal. The feedback message indicates a reception state of a received image frame sent by the transmitting terminal and received by the receiving terminal before the receiving terminal sends the feedback message. The method further includes acquiring a target image frame, encoding the target image frame according to a preset error correction mechanism to generate encoding data of the target image frame in response to the feedback message indicating a reception error, and sending the encoding data of the target image frame to the receiving terminal.

14 Claims, 9 Drawing Sheets

(56) References Cited

U.S. PATENT DOCUMENTS

| | | | |
|---|---|---|---|
| 10,313,685 B2 | 6/2019 | Lee et al. | |
| 10,595,025 B2 | 3/2020 | Lee et al. | |
| 2005/0223333 A1* | 10/2005 | Yamamoto | G06F 3/04845 |
| | | | 715/765 |
| 2008/0123775 A1 | 5/2008 | Abreu et al. | |
| 2011/0085602 A1* | 4/2011 | He | H04N 21/4425 |
| | | | 375/240.25 |
| 2011/0122063 A1* | 5/2011 | Perlman | A63F 13/335 |
| | | | 345/161 |
| 2011/0126255 A1* | 5/2011 | Perlman | H04N 19/14 |
| | | | 725/116 |
| 2011/0249729 A1 | 10/2011 | Zhou et al. | |
| 2011/0268186 A1 | 11/2011 | Mukherjee et al. | |
| 2013/0028088 A1 | 1/2013 | Do et al. | |
| 2014/0086446 A1 | 3/2014 | Han et al. | |
| 2016/0035224 A1 | 2/2016 | Yang et al. | |
| 2019/0334619 A1* | 10/2019 | Aoyama | G06F 3/0481 |

FOREIGN PATENT DOCUMENTS

| | | | |
|---|---|---|---|
| CN | 101166270 A | | 4/2008 |
| CN | 101193312 A | | 6/2008 |
| CN | 101207823 A | | 6/2008 |
| CN | 101360243 A | | 2/2009 |
| CN | 101690202 B | | 3/2010 |
| CN | 102014286 A | | 4/2011 |
| CN | 102075741 A | | 5/2011 |
| CN | 102299784 A | | 12/2011 |
| CN | 102510494 A | | 6/2012 |
| CN | 102547266 A | | 7/2012 |
| CN | 102684837 A | | 9/2012 |
| CN | 102780547 A | | 11/2012 |
| CN | 104270181 A | | 1/2015 |
| CN | 104660315 A | | 5/2015 |
| CN | 104756398 A | | 7/2015 |
| CN | 102484748 B | | 9/2015 |
| CN | 105681342 A | | 6/2016 |
| CN | 102075741 | * | 8/2017 |
| CN | 107005714 A | | 8/2017 |
| CN | 107113441 A | | 8/2017 |

OTHER PUBLICATIONS

World Intellectual Property Organization (WIPO) International Search Report for PCT/CN2016/113899 dated Oct. 10, 2017 5 pages.

World Intellectual Property Organization (WIPO) International Search Report and Written Opinion for PCT/CN2017/120225 dated Mar. 27, 2018 8 pages.

Qiang Peng, Rate-Distortion Analysis for Feedback-Based Adaptive Reference Picture Selection, Journal of Electronics & Information Technology, Jun. 2009, p. 1455-1459, vol. 31 No. 6, School of Information Science & Technology, Southwest Jiaotong University, Chengdu, China.

* cited by examiner

400

```
┌─────────────────────────────────────────────────────────────┐
│  Receiving the feedback message sent by the receiving       │
│  terminal according to the feedback time interval between   │── 410
│  sending two adjacent feedback messages by the receiving    │
│  terminal                                                   │
└─────────────────────────────────────────────────────────────┘
                              │
┌─────────────────────────────────────────────────────────────┐
│           Acquiring the first image frame                   │── 420
└─────────────────────────────────────────────────────────────┘
                              │
┌─────────────────────────────────────────────────────────────┐
│  Encoding the first image frame according to the preset     │
│  error correction mechanism to generate the encoding data   │
│  of the first image frame, if the feedback message          │
│  indicates the reception error, and the interval between    │
│  the frame number of the first image frame and the frame    │
│  number of the second image frame is greater than or        │── 430
│  equal to the feedback time interval, in which the second   │
│  image frame is the last image frame encoded according to   │
│  the preset error correction mechanism before the           │
│  transmitting terminal acquires the first image frame and   │
│  sent from the transmitting terminal to the receiving       │
│  terminal                                                   │
└─────────────────────────────────────────────────────────────┘
                              │
┌─────────────────────────────────────────────────────────────┐
│  Sending the encoding data of the first image frame to the  │── 440
│  receiving terminal                                         │
└─────────────────────────────────────────────────────────────┘
```

IMAGE PROCESSING METHOD AND DEVICE

CROSS-REFERENCE TO RELATED APPLICATION

This application is a continuation of International Application No PCT/CN2016/113944, filed on Dec. 30, 2016, the entire content of which is incorporated herein by reference.

TECHNICAL FIELD

The present disclosure generally relates to the field of image processing and, more particularly, to an image processing method and a device.

BACKGROUND

Image data transmission with low latency is a popular research topic. Transmission errors (e.g., a packet loss and/or a data error) occur during the transmission of image data, which leads to errors in decoding at a receiving terminal.

At present, the solution to the above technical problem is that a transmitting terminal periodically transmits intra-frame encoding data to the receiving terminal. Thus, whenever a data transmission error arises, the receiving terminal can correct the error according to the received intra-frame encoding data.

Even though the data is transmitted correctly with existing technologies, the transmitting terminal may still send the intra-frame encoding data to the receiving terminal, resulting in a waste of channel bandwidth and a loss of channel utilization.

SUMMARY OF THE DISCLOSURE

In accordance with the disclosure, there is provided an image processing method including a transmitting terminal receiving a feedback message sent by a receiving terminal. The feedback message indicates a reception state of a received image frame sent by the transmitting terminal and received by the receiving terminal before the receiving terminal sends the feedback message. The method further includes acquiring a target image frame, encoding the target image frame according to a preset error correction mechanism to generate encoding data of the target image frame in response to the feedback message indicating a reception error, and sending the encoding data of the target image frame to the receiving terminal.

Also in accordance with the disclosure, there is provided an image processing method including detecting whether a reception error has occurred to an image frame sent by a transmitting terminal, and, in response to detecting the reception error, sending a reception-error message to the transmitting terminal. The reception-error message indicates the reception error of the image frame sent by the transmitting terminal.

BRIEF DESCRIPTION OF THE DRAWINGS

FIG. 5 illustrates a flowchart of another example image processing method consistent with disclosed embodiments.

DETAILED DESCRIPTION

Reference will now be made in detail to example embodiments of the disclosure, which are illustrated in the accompanying drawings. Hereinafter, embodiments consistent with the disclosure will be described with reference to drawings. Wherever possible, the same reference numbers will be used throughout the drawings to refer to the same or like parts. The described embodiments are some but not all of the embodiments of the present disclosure. Based on the disclosed embodiments, persons of ordinary skill in the art may derive other embodiments consistent with the present disclosure, all of which are within the scope of the present disclosure. Further, in the present disclosure, the disclosed embodiments and the features of the disclosed embodiments may be combined under conditions without conflicts.

A transmitting terminal consistent with the present disclosure may send encoding data of image frames to a receiving terminal consistent with the present disclosure.

Figure 1:
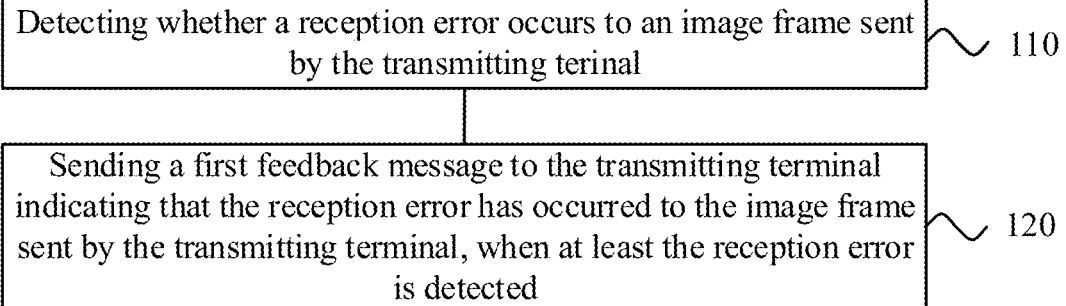
FIG. 1 illustrates a flowchart of an example image processing method consistent with disclosed embodiments.

FIG. 1 illustrates a flowchart of an example image processing method 100 consistent with disclosed embodiments. As shown in FIG. 1, the image processing method 100 includes detecting whether a reception error occurs to an image frame sent by the transmitting terminal (110), and, when at least the reception error is detected, sending a first feedback message to the transmitting terminal indicating that the reception error has occurred to the image frame sent by the transmitting terminal (120). The first feedback message is also referred to as a "reception-error message."

In some embodiments, the reception error may include one or both of two types of errors: data loss and data check error. For example, if a data packet corresponding to encoding data of an image frame A is lost in transmission, the reception state of the image frame A may be a reception error state. As another example, if a calculated check value of data of the data packet corresponding to the encoding data of the image frame A is inconsistent with a check code carried by the data packet, the reception state of the image frame A may be the reception error state.

After receiving the first feedback message, the transmitting terminal can recognize that the reception state of the image frame received by the receiving terminal before sending the first feedback message is the reception error state.

In some embodiments, during the transmission of the encoding data of the image frame from the transmitting terminal to the receiving terminal, once the reception error is detected at the receiving terminal, the feedback message indicating the reception error may be sent to the transmitting terminal, which allows the transmitting terminal to recognize in time that the reception state of the image frame sent is the reception error state and allows the transmitting terminal to take corresponding measures to correct the error, thus ensuring the reliability in transmitting the image frame.

In some embodiments, the transmitting terminal consistent with the present disclosure may be a movable object equipped with an imaging device. The movable object can be, for example, an unmanned aerial vehicle (UAV), an unmanned vehicle, or a movable robot. A movable object can be configured with a gimbal to carry the imaging device. The receiving terminal may be a remote controller or a terminal device with an application (APP) installed thereon to control the transmitting terminal. The remote controller or terminal device can be, for example, a smartphone or a tablet computer. The transmitting terminal can send the image frame to the receiving terminal via a wireless link. Prior to receiving the image frame sent from the transmitting terminal, the receiving terminal may have established a communication link with the transmitting terminal or directly with the imaging device of the transmitting terminal.

In some embodiments, at 120, when the reception error of the image frame sent from the transmitting terminal is detected, the first feedback message may be sent to the transmitting terminal.

In some embodiments, once the receiving terminal determines the reception error of the received image frame, the feedback message indicating the reception error may be immediately sent to the transmitting terminal. Instant feedback of the reception error to the transmitting terminal can allow the transmitting terminal to immediately take measures to correct the error, thus ensuring the reliability in transmitting the image frame.

In some embodiments, at 120, if the reception error of the image frame has been detected that was sent from the transmitting terminal, and if a first preset time length is reached after the detection of the reception error, then the first feedback message may be sent to the transmitting terminal.

In some embodiments, the first preset time length may be preconfigured by a system, or may be determined in real time according to specific needs.

In some embodiments, at 120, if the receiving terminal has determined that the reception error of the received image frame occurs, the receiving terminal may wait for a preset time length to send the feedback message indicating the reception error to the transmitting terminal.

In some embodiments, the first preset time length may be constant or variable.

In some embodiments, at 120, if the reception error of the image frame has been detected that was sent from the transmitting terminal, if the first preset time length has been reached after the detection of the reception error, and if a second preset time length is reached after the last transmission of the feedback message, then the first feedback message may be sent to the transmitting terminal.

In some embodiments, the second preset time length may be constant or variable.

In some embodiments, if the receiving terminal determines that the reception error of the received image frame occurs, the receiving terminal may wait for a period of time to send the first feedback message to the transmitting terminal. The period of time waited is such that the time interval between sending the first feedback message and sending the last feedback message to the transmitting terminal may be equal to the second preset time length.

In some embodiments, at 120, after the last feedback message has been sent to the transmitting terminal, if the reception error of the image frame sent by the transmitting terminal has been detected for the first time, and if the first preset time length is reached after the first detection of the reception error, then the first feedback message may be sent to the transmitting terminal.

In some embodiments, during the transmission of the image frame between the transmitting terminal and the receiving terminal, if the receiving terminal detects for the first time the reception error of the image frame sent by the transmitting terminal and received by the receiving terminal, the first feedback message may be sent to the transmitting terminal after the first preset time length has elapsed.

In some embodiments, at 120, if a preset feedback time point is reached and the reception error is detected, the first feedback message may be sent to the transmitting terminal.

In some embodiments, the receiving terminal may send the feedback message to the transmitting terminal every certain feedback time interval. In some embodiments, the feedback time interval may be preset. In some embodiments, the feedback time interval may be determined according to actual situations. The feedback time interval may be constant or variable.

For example, the feedback time interval may be preset as fixed and constant. For another example, a plurality of feedback time intervals corresponding to different periods of time in one day may be preset according to experience, and the feedback message may be sent at the corresponding feedback time interval in each period of time. For another example, a plurality of feedback time intervals corresponding to different positions where the receiving terminal is located may be preset according to experience, and according to a current position where the receiving terminal is located, the feedback time interval corresponding to the current position may be applied.

For another example, according to actual situation at present or actual situation within a certain historical period, a new time interval may be determined every certain period of time, and the new time interval may be used as the feedback time interval during such certain period of time. The period of time may be constant or variable. The certain historical period may be the last feedback time interval or the last few feedback time intervals, or may be the last period of time or the last few periods of time. For another example, after the receiving terminal has sent a feedback message, the time point to send the next feedback message may be determined according to the actual situation at present or the actual situation within a certain historical period, in which the certain historical period may be the last feedback time interval or the last few feedback time intervals.

According to the actual situation, there may be various methods for determining the feedback time interval.

For example, with a stable communication channel, the receiving terminal may send the feedback message to the transmitting terminal at a longer feedback time interval, thereby lowering the channel load. With a poor communication channel, the receiving terminal may send the feedback message to the transmitting terminal at a shorter feedback time interval, which can ensure the reliability in transmitting the image frame.

For another example, the receiving terminal may send the feedback message to the transmitting terminal by using a feedback time interval F1 within a period of time P1. The receiving terminal may send the feedback message to the transmitting terminal by using a feedback time interval F2 within a period of time P2 after the period of time P1. The feedback time interval F1 may differ from the feedback time interval F2. In some embodiments, the period of time P1 and the period of time P2 can be preset by the system or a user.

For another example, the feedback time interval may be dynamically determined according to at least one piece of the following information: feedback channel load, instant requirements for the error correction at application scenarios, or transmission status of historical data. In some embodiments, if the transmitting terminal is a UAV, the feedback time interval may be dynamically determined according to attitude information of the transmitting terminal.

In some embodiments, the feedback time interval may be determined according to the load at the feedback channel (also referred to as a "feedback channel load"). For example, if the feedback channel load reaches a threshold, the feedback time interval may be lengthened. If the feedback channel load is less than the threshold, the feedback time interval may be shortened.

In some embodiments, the feedback time interval may be determined according to the instant requirements for the error correction at application scenarios. For example, the instant requirements for the error correction at application scenarios may be that at least three of the five encoding data of the sent image frame should be correct. In actual transmission, if the transmission accuracy reaches 60% (i.e., ⅗), the feedback time interval may be lengthened. If the transmission accuracy is less than 60%, the feedback time interval may be shortened.

In some embodiments, the feedback time interval may be determined according to the transmission status of historical data. For example, if the number of the feedback messages that consecutively appear and indicate the reception error is less than a first preset value, or if the total number of the feedback messages in a preset period of time that indicate the reception error is less than a second preset value, the feedback time interval could be lengthened. If the number of the feedback messages that consecutively appear and indicate the reception error is not less than the first preset value, or if the total number of the feedback messages in the preset period of time that indicate the reception error is not less than the second preset value, the feedback time interval could be shortened.

In some embodiments, if the transmitting terminal is a movable device (e.g., a UAV), the feedback time interval may also be determined according to the attitude information of the transmitting terminal. The attitude information may include but is not limited to three-dimensional (3D) position, 3D angle, 3D velocity, 3D acceleration, and/or 3D angular velocity. For example, if the 3D velocity of the transmitting terminal is relatively high, which indicates a relatively large change among images captured at the transmitting terminal, the feedback time interval could be shortened. For another example, if the 3D velocity of the transmitting terminal is relatively low (e.g., the 3D velocity is 0), which indicates a relatively small change among the images captured at the transmitting terminal (e.g., the captured images are almost identical), the feedback time interval could be lengthened.

In some embodiments, the transmitting terminal may determine the attitude information according to the attitude information measured by a sensing system of the transmitting terminal. The attitude information of the transmitting terminal may include at least one piece of the following information: 3D position, 3D angle, 3D velocity, 3D acceleration, or 3D angular velocity. The sensing system of the transmitting terminal may include at least one of a gyroscope, an electronic compass, an inertial measurement unit (IMU), a visual sensor, a global positioning system (GPS), or a barometer.

In some embodiments, the feedback message may be sent to the transmitting terminal at a variable feedback time interval, which can reduce the channel load to a certain extent.

In some embodiments, the feedback time interval may be determined by the transmitting terminal according to one or more of the five factors mentioned above. The determined feedback time interval may be sent to the receiving terminal by the transmitting terminal. The receiving terminal may send the feedback message to the transmitting terminal according to the feedback time interval received.

In other words, after every feedback message has been sent by the receiving terminal, the next time point (i.e., the abovementioned preset feedback time point) to send the feedback message could be determined. When the preset feedback time point is reached, the feedback message may be sent to the transmitting terminal. In these embodiments, the feedback message sent by the receiving terminal may be or not be the first feedback message, which depends on the reception state of the image frame sent by the transmitting terminal that is detected by the receiving terminal.

In some embodiments, the feedback time interval may be directly determined by the receiving terminal according to one or more pieces of the following information: feedback channel load, instant requirements for the error correction at application scenarios, and transmission status of historical data.

For specific methods, reference can be made to the foregoing description, which will not be repeated herein.

In some embodiments, the feedback time interval may be determined by negotiation between the transmitting terminal and the receiving terminal.

In some embodiments, the receiving terminal may determine the feedback time interval F1 according to at least one piece of the following information: feedback channel load, instant requirements for the error correction at application scenarios, or transmission status of historical data. The receiving terminal may receive the feedback time interval F2 sent by the transmitting terminal. The receiving terminal may determine the feedback time interval F3 according to the feedback time interval F1 and the feedback time interval F2. For example, the feedback time interval determined by the receiving terminal according to the feedback channel load can be denoted as a first interval, and the feedback time interval received by the receiving terminal that is determined by the transmitting terminal according to the attitude information of the transmitting terminal can be denoted as a second interval. Further, the preset arrangement may be that the receiving terminal uses the second interval as the feedback time interval if the first interval is longer than the second interval. Then, when the first interval determined by the receiving terminal is longer than the second interval determined by the transmitting terminal, the second interval may be used as the final feedback time interval.

In some embodiments, the receiving terminal may send the feedback message to the transmitting terminal by using a variable feedback time interval, which can improve the channel utilization to a certain extent.

In some embodiments, the first feedback message may be sent to the transmitting terminal, if encoding data of the image frame sent by the transmitting terminal has not been correctly received before the preset feedback time point and after the last time the reception error of the image frame sent by the transmitting terminal is detected. The encoding data of the image frame can be encoded according to a preset error correction mechanism.

In other words, in some embodiments, the first feedback message may be sent to the transmitting terminal, if the reception error of the image frame sent by the transmitting terminal is detected before the preset feedback time point and after the last time the encoding data of the image frame encoded according to the preset error correction mechanism and sent by the transmitting terminal was correctly received by the receiving terminal.

In some embodiments, according to the received encoding data of the image frame sent by the transmitting terminal, the receiving terminal may determine and recognize that the encoding data of the image frame encoded according to the preset error correction mechanism and sent by the transmitting terminal has not been correctly received after the last detection of the reception error of the image frame sent by the transmitting terminal and before the feedback message is to be sent. According to such determination result, the receiving terminal may generate the first feedback message to indicate the reception error.

In some embodiments, if the receiving terminal detects the reception error of a newly received image frame sent by the transmitting terminal, and the image frame is the first image frame transmitted between the transmitting terminal and the receiving terminal, then the first feedback message can be generated to indicate the reception error.

In some embodiments, the feedback message may be stored at the receiving terminal. Anytime the receiving terminal detects the reception error, the feedback message may be set to indicate the reception error. Only when the encoding data of the image frame encoded according to the preset error correction mechanism is correctly received, the feedback message may be set to indicate the correct reception. For example, when the receiving terminal detects the reception error, the feedback message may be set as carrying 1. When the encoding data of the image frame encoded according to the preset error correction mechanism is correctly received, the feedback message may be set as carrying 0. Once the preset feedback time point is reached, the receiving terminal may send the stored feedback message to the transmitting terminal.

When receiving the feedback message indicating the reception error, the transmitting terminal may use the preset error correction mechanism (such as an error-tolerant-frame mechanism or an error-tolerant-frame-group mechanism) to encode the current to-be-sent image frame. The receiving terminal may recover the subsequent to-be-decoded image frame after receiving the image frame encoded according to the preset error correction mechanism, which can ensure the reliability in transferring the image frame between the transmitting terminal and the receiving terminal.

In some embodiments, the preset error correction mechanism may refer to such an encoding mechanism that can be used by the receiving terminal to obtain the correct decoding data of the image frame.

In some embodiments, after the first feedback message is sent to the transmitting terminal, if the encoding data of the image frame encoded according to the preset error correction mechanism and sent by the transmitting terminal is not correctly received before the next preset feedback time point after the current preset feedback time point, then the first feedback message can be sent to the transmitting terminal.

In some embodiments, after the receiving terminal sends the first feedback message indicating the reception error to the transmitting terminal at a feedback time point (e.g., T1), and before the next feedback time point (e.g., T2), if the encoding data of the image frame encoded according to the preset error correction mechanism and sent by the transmitting terminal has not been correctly received, then the receiving terminal may continue to send the first feedback message indicating the reception error to the transmitting terminal at the next feedback time point (e.g., T2). This process can continue until the encoding data of the image frame encoded according to the preset error correction mechanism and sent by the transmitting terminal is correctly received, and then the feedback message indicating the correct reception may be sent to the transmitting terminal at the corresponding feedback time point.

The image processing method consistent with the disclosure can improve the reliability in transferring the image frame.

In some embodiments, if the encoding data of the image frame encoded according to the preset error correction mechanism and sent by the transmitting terminal is correctly received before the preset feedback time point and after the last detection of the reception error of the image frame sent by the transmitting terminal, a second feedback message indicating the correct reception of the image frame sent by the transmitting terminal may be sent to the transmitting terminal. The second feedback message is also referred to as a "reception-correct message."

In some embodiments, according to the reception state of the image frame sent by the transmitting terminal and received by the receiving terminal, the receiving terminal may determine and recognize that the encoding data of the image frame encoded according to the preset error correction mechanism and sent by the transmitting terminal is correctly received after the last detection of the reception error of the image frame sent by the transmitting terminal and before the feedback message is sent. According to such determination result, the second feedback message may be generated to indicate the correct reception.

In some embodiments, if the newly-received image frame sent by the transmitting terminal is an image frame encoded according to the preset error correction mechanism that is correctly received, and if the image frame is the first image frame transmitted between the transmitting terminal and the receiving terminal, then the feedback message may be generated to indicate the correct reception, i.e., the feedback message may be configured to indicate the correct reception.

In some embodiments, if the receiving terminal detects that the newly-received image frame sent by the transmitting terminal is an image frame encoded using inter-frame encoding that is correctly received, but the first image frame transmitted between the transmitting terminal and the receiving terminal is an image frame encoded according to the preset error correction mechanism that is correctly received, and no reception error has ever occurred to image frames transmitted between the transmitting terminal and the receiving terminal within the period after the first image frame transmitted and before the newly-received image frame, then the feedback message may be generated to indicate the correct reception, i.e., the feedback message may be configured to indicate the correct reception.

When the feedback message indicates the correct reception, the image processing method 100 may further include receiving the inter-frame encoding data of the first image frame sent by the transmitting terminal.

In some embodiments, according to the feedback message, the transmitting terminal may recognize that the reception state of the image frame sent by the transmitting terminal and received by the receiving terminal before sending the feedback message is the correct reception state. In this case, the transmitting terminal may encode the first image frame with the inter-frame encoding to generate the inter-frame encoding data of the first image frame, and send the inter-frame encoding data of the first image to the receiving terminal.

In the present disclosure, correct reception refers to that neither data loss nor data error happened to the transmitted data. For example, if there is no loss of a data packet during the transmission of a data packet corresponding to the encoding data of an image frame A, and a calculated check value of the data of the data packet is consistent with a check code carried by the data packet, then the image frame A may be regarded as correctly received, i.e., the reception state of the image frame A may be correct reception.

In some embodiments, when the receiving terminal detects the reception error, the receiving terminal may configure the feedback message to indicate the reception error. When the receiving terminal correctly receives the encoding data of the image frame encoded according to the preset error correction mechanism, the receiving terminal may configure the feedback message to indicate the correct reception. After receiving the feedback message indicating the reception error, the transmitting terminal may encode the to-be-sent image frame by using the preset error correction mechanism (e.g., the error-tolerant-frame mechanism or the error-tolerant-frame-group mechanism). The receiving terminal may receive the image frame encoded according to the preset error correction mechanism and correct the error of the subsequent to-be-decoded image frame, which can ensure the reliability in transmitting the image frame between the transmitting terminal and the receiving terminal.

The receiving terminal may detect the reception state of the encoding data of every image frame and update the feedback message in real time according to the reception state.

In some embodiments, during the transmission of the encoding data of the image frame between the transmitting terminal and the receiving terminal, when the receiving terminal detects for the first time the reception error of the image frame sent by the transmitting terminal, the receiving terminal may configure the feedback message to indicate the reception error. The feedback message may remain to indicate the reception error, until the receiving terminal determines and recognizes that, after the last detection of the reception error of the image frame sent by the transmitting terminal, the encoding data of the image frame encoded according to the error correction mechanism and sent by the transmitting terminal has been correctly received, at which time the feedback message can be configured to indicate the correct reception.

In some embodiments, in the scenario that the configuration of the feedback message indicates the reception error, if the receiving terminal correctly receives the last image frame but the received image frame was not encoded according to the preset error correction mechanism (i.e., after the last detection of the reception error of the image frame sent by the transmitting terminal, the encoding data of the image frame encoded according to the preset error correction mechanism and sent by the transmitting terminal has not been correctly received), then the feedback message may be maintained to indicate the reception error.

In some embodiments, the feedback message may have an identification. The identification being a first identification may indicate that the feedback message indicates the reception error, which corresponds to the first feedback message described above. On the other hand, the identification being a second identification may indicate that the feedback message indicates the correct reception, which corresponds to the second feedback message described above.

In some embodiments, the identification carried by the feedback message may be configured as the first identification (i.e., the feedback message may be configured to indicate the reception error) if, according to the reception state of the received image frame, the receiving terminal determines and recognizes that, after the last detection of the reception error of the image frame sent by the transmitting terminal, the encoding data of the image frame encoded according to the preset error correction mechanism and sent by the transmitting terminal has not been correctly received. In some embodiments, the identification carried by the feedback message may be configured as the second identification (i.e., the feedback message may be configured to indicate the correct reception) if, according to the reception state of the received image frame, the receiving terminal determines and recognizes that, after the last detection of the reception error of the image frame sent by transmitting terminal, the encoding data of the image frame encoded according to the preset error correction mechanism and sent by the transmitting terminal has been correctly received.

Figure 2:
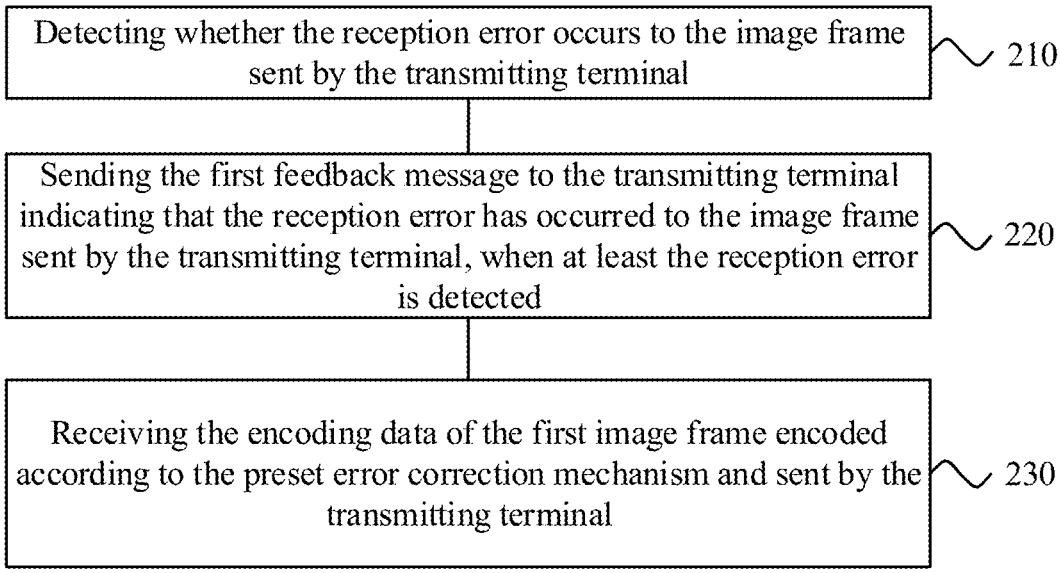
FIG. 2 illustrates a flowchart of another example image processing method consistent with disclosed embodiments.

FIG. 2 illustrates a flowchart of another example image processing method 200 consistent with disclosed embodiments. As shown in FIG. 2, the image processing method 200 includes detecting whether the reception error occurs to the image frame sent by the transmitting terminal (210), sending the first feedback message to the transmitting terminal to indicate that the reception error has occurred to the image frame sent by the transmitting terminal occurs when at least the reception error is detected (220), and receiving the encoding data of the first image frame encoded according to the preset error correction mechanism and sent by the transmitting terminal (230).

In some embodiments, at 230, the encoding data of the first image frame may be obtained by the transmitting terminal through encoding the first image frame according to the preset error correction mechanism.

In some embodiments, the preset error correction mechanism may refer to such an encoding mechanism that allows a decoder (corresponding to the receiving terminal consistent with the present disclosure) to obtain the corresponding complete original data (i.e., the data before encoding) only using the encoding data. In some embodiments, the preset error correction mechanism may be an error-tolerant-frame error correction mechanism, an error-tolerant-frame-group error correction mechanism, or another feasible error correction mechanism, which is not limited herein. The errortolerant-frame error correction mechanism and the error-tolerant-frame-group error correction mechanism will be described below.

In some embodiments, when the feedback message indicates the reception error, the encoding data of the first image frame encoded according to the preset error correction mechanism and sent by the transmitting terminal may be received. The encoding data of the first image frame may include at least the intra-frame encoding data of a partial picture of the first image frame.

The partial picture of the image frame consistent with the present disclosure may refer to a picture size of the image frame and is unrelated to data information of the image frame. For example, when the entire picture of an image frame is divided into five small blocks, any one of the five blocks may be referred to as a partial picture of the image frame, and the five partial pictures may together constitute the full picture of the image frame.

In existing technologies, the transmitting terminal periodically sends the intra-frame encoding data to the receiving terminal, such that the intra-frame encoding data could be transmitted in the communication channel even though the image frames have been correctly received (i.e., the communication channel is stable). Because the compression rate of intra-frame encoding is relatively low, the code rate of the intra-frame encoding data is relatively high. Hence, unnecessary transmission of the intra-frame encoding data results in a waste of channel resources and reduces channel utilization.

In some embodiments, if the feedback message indicates the correct reception of the image frame, the inter-frame encoding data of the current image frame may be sent to the receiving terminal. In some embodiments, if the feedback message indicates the reception error of the image frame, the intra-frame encoding data of the current image frame may be sent to the receiving terminal. In other words, the intra-frame encoding consistent with the present disclosure may be used if the data is not transmitted correctly, which can effectively improve the channel utilization as compared to the existing technologies. In some embodiments, the intra-frame encoding data may be sent if the data is not transmitted correctly, which can prevent the error spreading out and thus realize the error correction.

In some embodiments, the encoding data of the first image frame may include the intra-frame encoding data of a partial picture and the inter-frame encoding data of the remaining partial picture(s) of the first image frame.

After the encoding data of the first image frame sent by the transmitting terminal has been received, the image processing method 200 may further include, when receiving encoding data of M image frames sent by the transmitting terminal, determining whether the encoding data of the image frames encoded according to the preset error correction mechanism and sent by the transmitting terminal is correctly received, where M is a positive integer.

The encoding data of each of the M image frames may include the intra-frame encoding data of a partial picture and the inter-frame encoding data of the remaining partial picture(s) (i.e., the intra-frame encoding data of a portion of the image frame and the inter-frame encoding data of the remaining portion of the image picture). Among the M+1 image frames including the M image frames and the first image frame, the partial picture of the i-th image frame for the intra-frame encoding may be different from the partial picture of the j-th image frame for the intra-frame encoding (e.g., the location of the partial picture of the i-th image frame for the intra-frame encoding in the i-th image frame may be different from the location of the partial picture of the j-th image frame for the intra-frame encoding in the j-the image frame), and the combination of the M+1 partial pictures for the intra-frame encoding may constitute a full picture, where i and j are positive integers, 1≤i≤M+1, 1≤j≤M+1, and i≠j.

Figure 3:
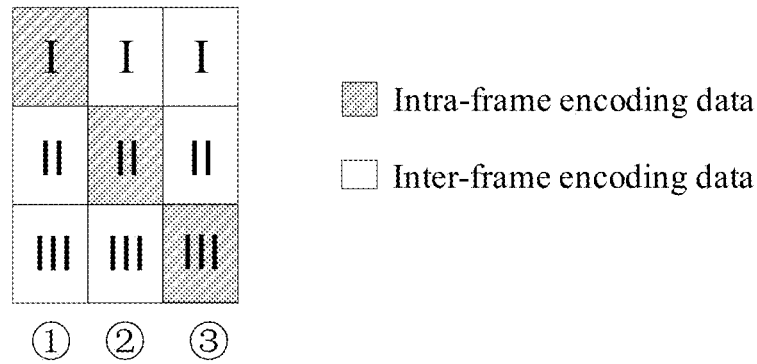
FIG. 3 illustrates a schematic diagram of an example error-tolerant-frame-group error correction mechanism consistent with disclosed embodiments.

FIG. 3 illustrates a schematic diagram of an example error-tolerant-frame-group error correction mechanism consistent with disclosed embodiments. As shown in FIG. 3, the image frame ① is the first image frame, and the image frames ② and ③ are the M image frames (i.e., M=2). Example method for encoding and transmitting the image frames, ①, ②, and ③ are described below. The partial picture I of the image frame ① can be encoded via the intra-frame encoding to obtain the corresponding intra-frame encoding data and the partial pictures II and III of the image frame ① can be encoded via the inter-frame encoding to obtain the corresponding inter-frame encoding data. The partial pictures II and III may be encoded together as a whole or be encoded separately via the inter-frame encoding, which is not limited herein. The intra-frame encoding data of partial picture I and the inter-frame encoding data of partial pictures II and III of the image frame ① can be sent to the receiving terminal. The partial picture II of the image frame ② can be encoded via the intra-frame encoding to obtain the corresponding intra-frame encoding data and the partial pictures I and III of the image frame ② can be encoded via the inter-frame encoding to obtain the corresponding the inter-frame encoding data. The intra-frame encoding data of partial picture II and the inter-frame encoding data of partial pictures I and III of the image frame ② can be sent to the receiving terminal. The partial picture III of the image frame ③ can be encoded via the intra-frame encoding to obtain the corresponding intra-frame encoding data and the partial pictures I and II of the image frame ③ can be encoded via the inter-frame encoding to obtain the corresponding inter-frame encoding data. The intra-frame encoding data of partial picture III and the inter-frame encoding data of partial pictures I and II of the image frame ③ can be sent to the receiving terminal.

In some embodiments, the image frames ② and ③ can be encoded before the encoding data of the image frame ① is sent to the receiving terminal.

The partial picture consistent with the present disclosure may refer to a portion of an image frame. As shown in FIG. 3, although the partial pictures of the image frames ①, ②, and ③ for the intra-frame encoding are different to one another, the combination of the partial pictures (i.e., partial picture I of image frame ①, partial picture II of image frame ②, and partial picture III of image frame ③) subject to the intra-frame encoding constitutes a full frame.

In some embodiments, once correctly receiving the encoding data of the image frame ①, ② and ③, the receiving terminal can obtain the complete data of the partial picture I of the image frame ①, the partial picture II of the image frame ②, and the partial picture III of the image frame ③, thus the complete data of the three partial pictures can be used as reference data for the following inter-frame decoding.

FIG. 3 is only an example and not a limitation. In practical applications, the image frames can be divided into partial pictures in any feasible manner according to specific requirements, which is not limited herein.

The error-tolerant-frame-group error correction mechanism consistent with the present disclosure can improve the channel utilization, by sending the intra-frame encoding data of a partial picture and the inter-frame data of the remaining partial picture(s) of the first image frame.

As shown in FIG. 3, the image frames ①, ② and ③ can be referred to as the error tolerant frame group.

The encoding data of the first image frame and the M image frames consistent with the present disclosure can be referred to as an error tolerant frame group. The encoding mechanism in these embodiments can be referred to as the error-tolerant-frame-group error correction mechanism.

In some embodiments, the encoding data of the first image may include the intra-frame encoding data of the entire picture of the first image frame.

When the encoding data of the first image frame consistent with the present disclosure includes the intra-frame encoding data of the entire picture of the first image frame, the encoding data of the first image frame can be referred to as an error tolerant frame. The encoding mechanism in these embodiments can be referred to as an error-tolerant-frame error correction mechanism.

In some embodiments, before detecting whether the reception error of the image frame sent by the transmitting terminal occurs, the image processing method consistent with the present disclosure may further include receiving a data packet sent by the transmitting terminal. The data packet may be obtained after the transmitting terminal packs the encoding data of the second image frame and may include a packet sequence number and/or a check code.

Whether the reception error of the image frame sent by the transmitting terminal occurs may be detected according to the packet sequence number and/or the check code of the data packet.

In some embodiments, in the real-time transport protocol (RTP), the packet sequence number may be an RTP packet sequence number, while in transmission control protocol/internet protocol (TCP/IP), the packet sequence number may be an IP packet sequence number. The check code may be a cyclic redundancy check (CRC) code or another check code.

In some embodiments, the receiving terminal may determine whether the data is lost or not according to the continuity of the packet sequence number of the received data packet. If the packet sequence number is discontinuous, it may indicate that the data is lost and thus the receiving terminal may determine that the reception error of the image frame occurs. In some embodiments, the receiving terminal may determine whether the data is lost or not according to the check code of the data packet. If the check value of the data of the data packet is inconsistent with the check code of the data packet, it may indicate that the data is lost and thus the receiving terminal may determine that the reception error of the image frame occurs.

In some embodiments, the packet sequence number of the data packet may correspond to the frame number of the corresponding image frame.

Consistent with the disclosure, during the transmission of the encoding data of the image frame from the transmitting terminal to the receiving terminal, when the transmitting terminal receives the feedback message indicating the reception error sent by the receiving terminal, the transmitting terminal may send to the receiving terminal the encoding data of the image frame encoded according to the preset error correction mechanism. In some embodiments, if no feedback message indicating the reception error is received, the transmitting terminal does not send the encoding data encoded according to the preset error correction mechanism. Compared to the existing technologies where the encoding data of the image frame encoded according to the preset error correction mechanism is periodically transmitted regardless of the reception state of the transferred data, the image processing method consistent with the present disclosure can effectively improve the channel utilization.

The image processing methods consistent with the present disclosure are described above from the perspective of the receiving terminal, and the image processing methods consistent with the present disclosure will be described below from the perspective of the transmitting terminal.

Figure 4:
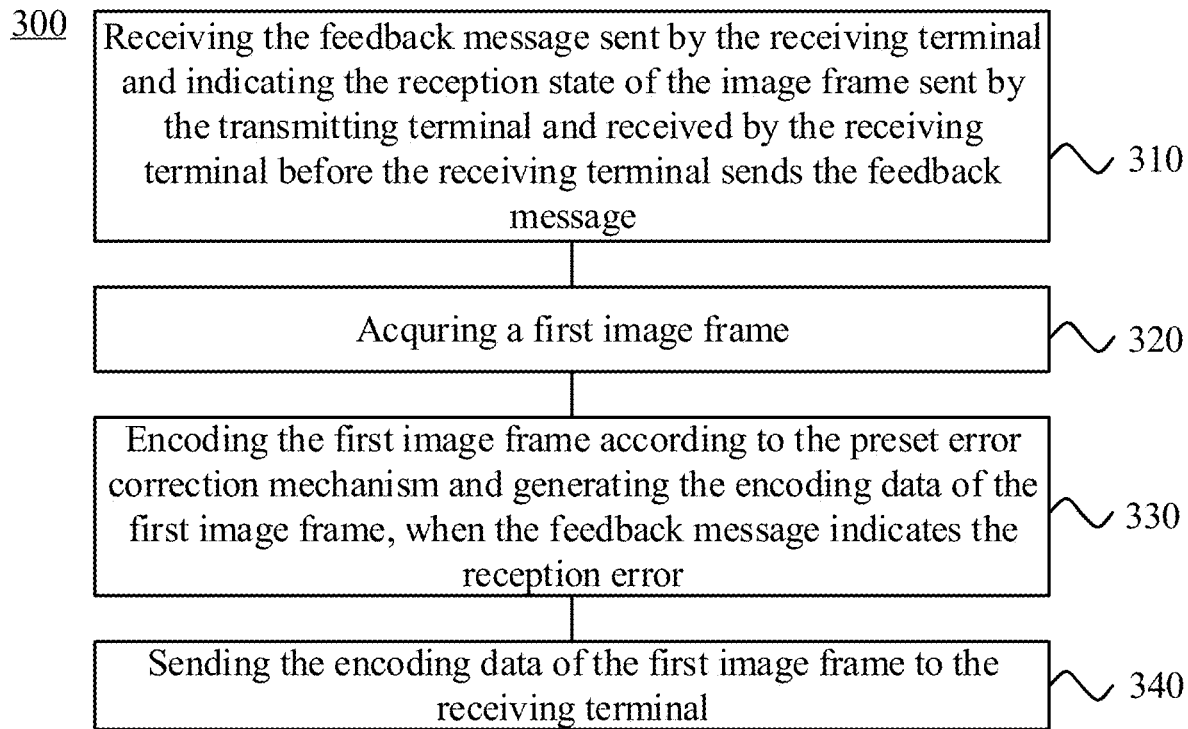
FIG. 4 illustrates a flowchart of another example image processing method consistent with disclosed embodiments.
Figure 6A:
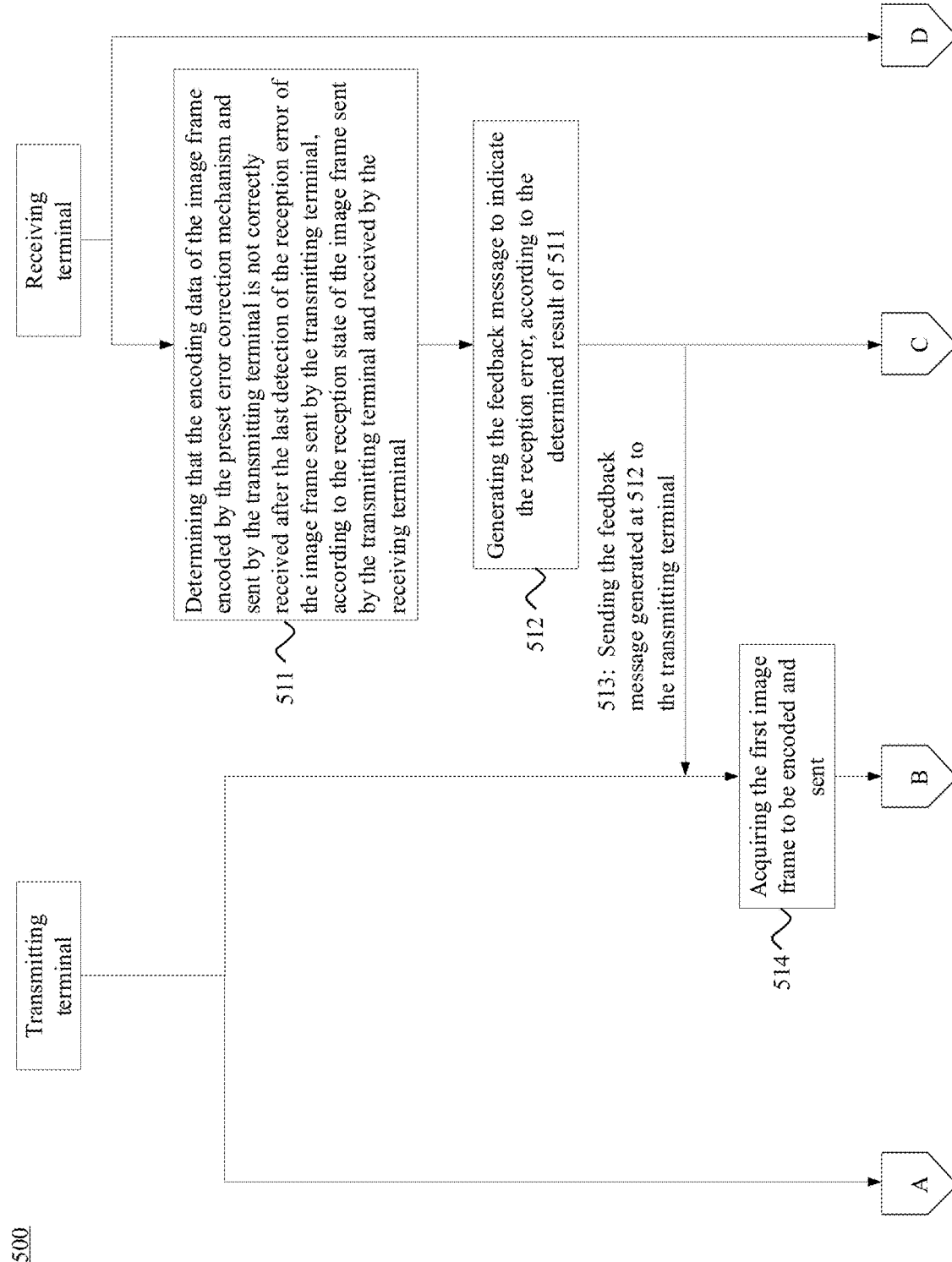
FIGS. 6A-6D illustrate a flowchart of another example image processing method consistent with disclosed embodiments.
Figure 6B:
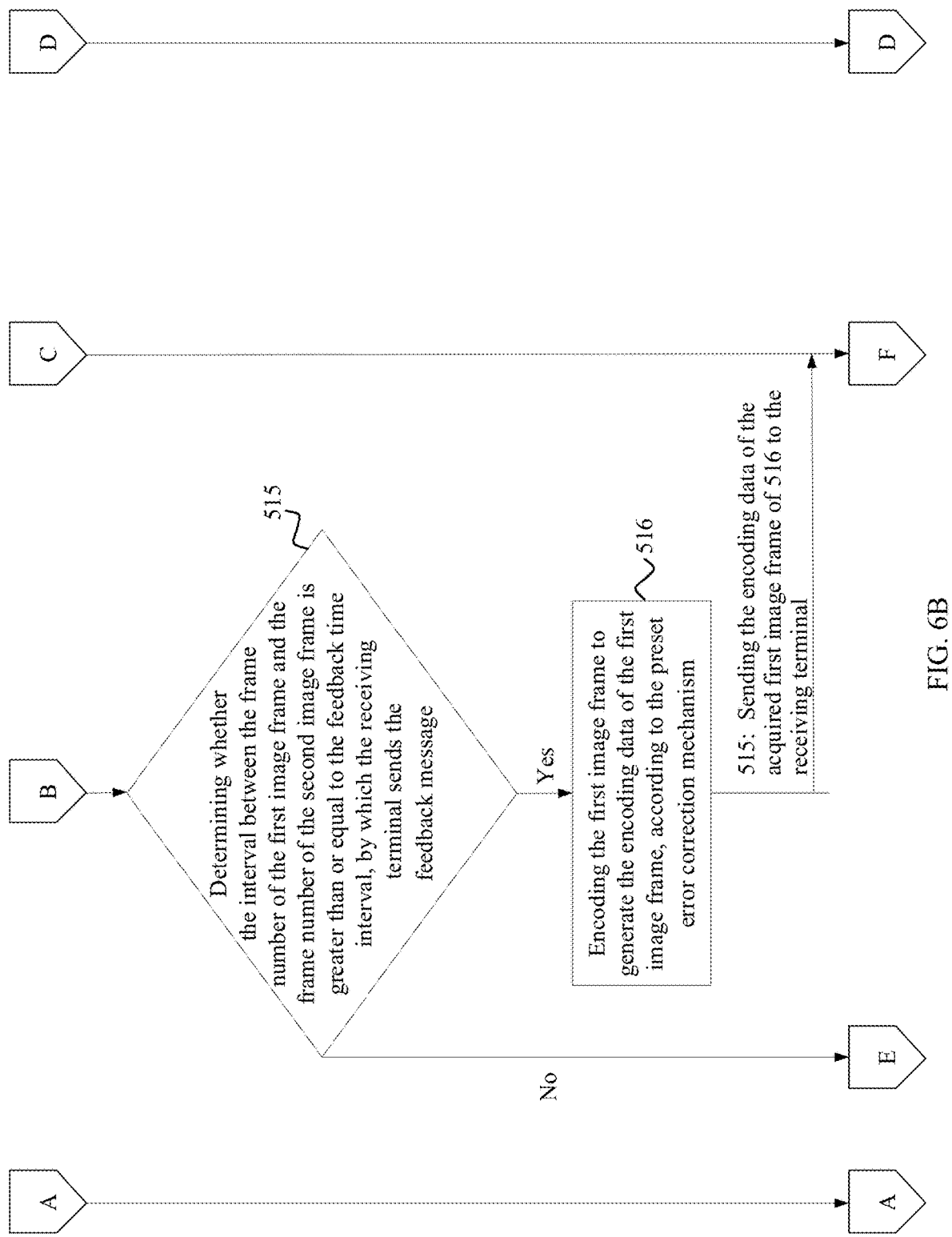
Figure 6C:
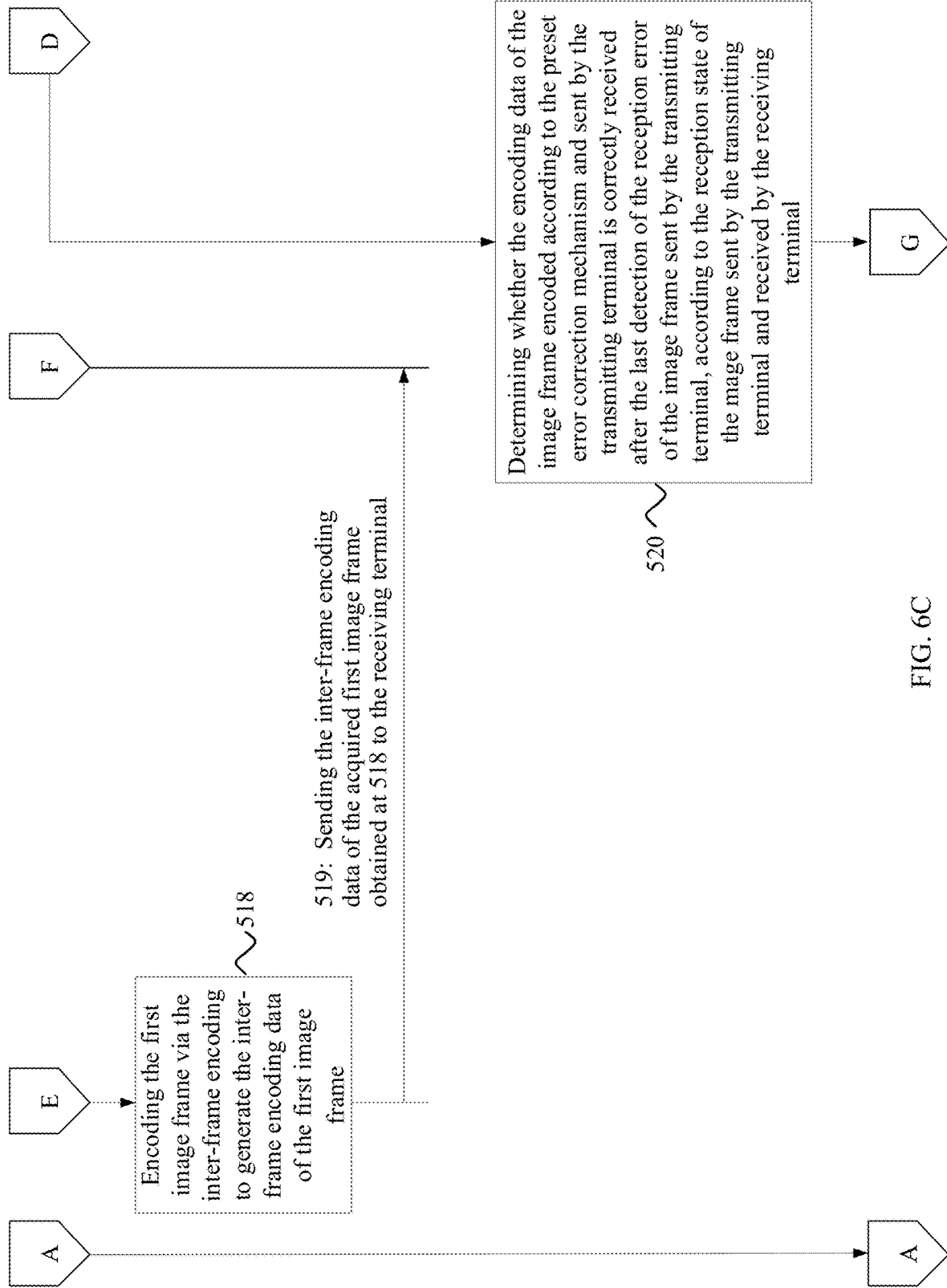
Figure 6D:
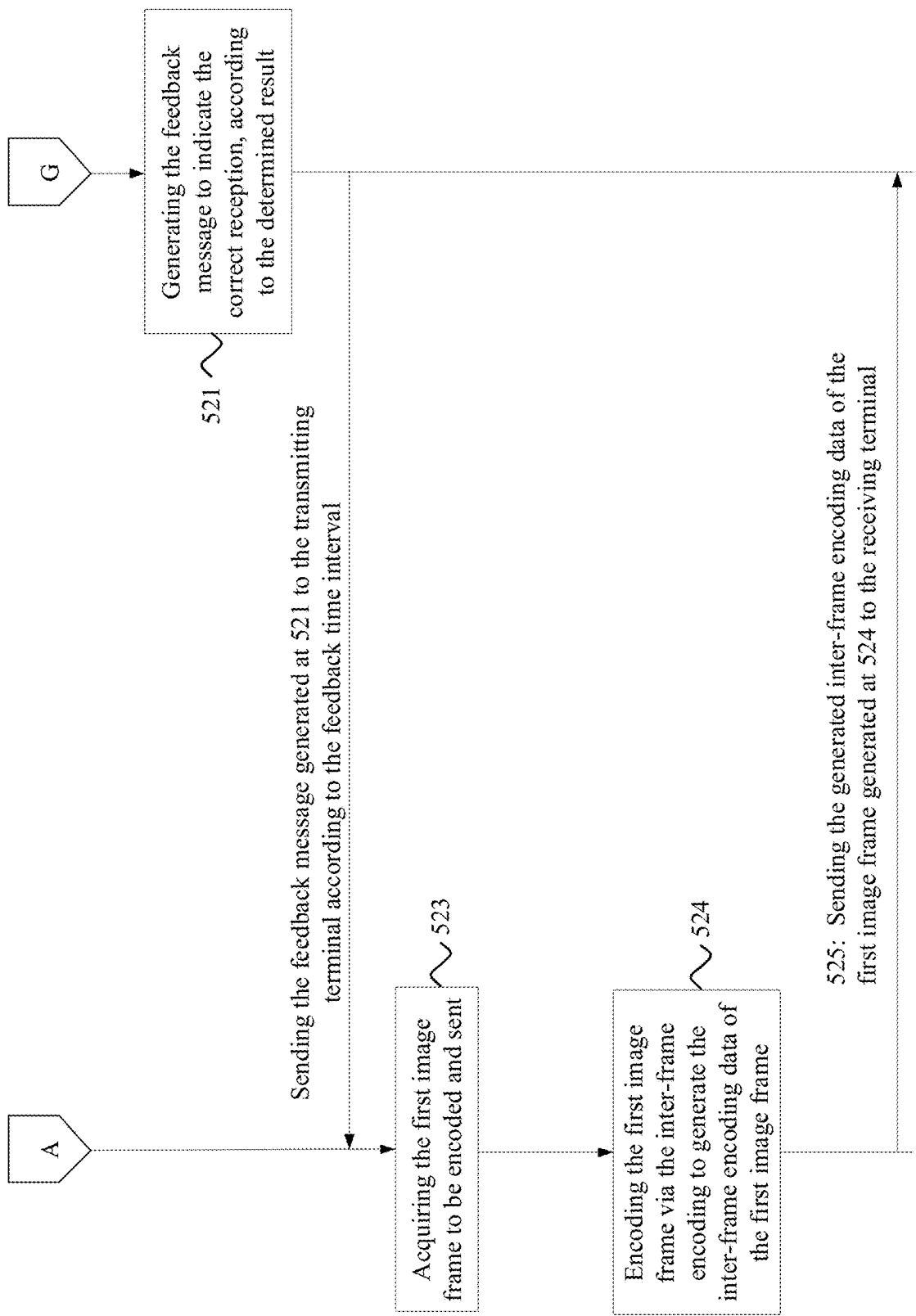

FIG. 4 illustrates a flowchart of another example image processing method 300 consistent with disclosed embodiments. As shown in FIG. 4, the image processing method 300 includes: at 310, receiving the feedback message sent by the receiving terminal and indicating the reception state of the image frame sent by the transmitting terminal and received by the receiving terminal before the receiving terminal sends the feedback message; at 320, acquiring a first image frame; at 330, encoding the first image frame according to the preset error correction mechanism and generating the encoding data of the first image frame, when the feedback message indicates the reception error; and at 340, sending the encoding data of the first image frame to the receiving terminal. Hereinafter, the first image frame being processed and sent by the transmitting terminal is also referred to as a "first to-be-sent image frame" or a "first target image frame."

In some embodiments, at 310, after receiving the feedback message, the transmitting terminal can recognize the reception state of the image frame sent by the transmitting terminal and received by the receiving terminal before the receiving terminal sends the feedback message.

In some embodiments, process at 310 may correspond to process at 120 described above.

In some embodiments, at 320, the first image frame may include a current image frame that is to be encoded and sent by the transmitting terminal.

In some embodiments, at 330, the preset error correction mechanism may refer to an encoding mechanism that enables the receiving terminal to correctly obtain the corresponding decoding data according to the encoding data encoded by such mechanism. In some embodiments, the preset error correction mechanism may be an error-tolerant-frame error correction mechanism, an error-tolerant-frame-group error correction mechanism, or another feasible error correction mechanism, which is not limited herein.

In some embodiments, process at 340 may correspond to process at 130 described above.

In some embodiments, during the transmission of the encoding data of the image frame from the transmitting terminal to the receiving terminal, when the transmitting terminal receives the feedback message indicating the reception error sent by the receiving terminal, the transmitting terminal may send the encoding data of the image frame encoded according to the preset error correction mechanism to the receiving terminal. In some embodiments, if no feedback message indicating the reception error is received, the transmitting terminal does not send the encoding data encoded according to the preset error correction mechanism. Compared to the existing technologies, where the encoding data of the image frame encoded according to the preset error correction mechanism is periodically transmitted regardless of the reception state of the transferred data, the image processing method consistent with the present disclosure can effectively improve the channel utilization.

In some embodiments, the transmitting terminal consistent with the present disclosure may be a movable object equipped with an imaging device, such as a UAV, an unmanned vehicle, or a movable robot. The movable object can be configured with a gimbal to carry the imaging device. The receiving terminal may be a remote controller or a terminal device with an APP installed thereon to control the transmitting terminal. The remote controller or terminal device can be, for example, a smart phone or a tablet computer. The transmitting terminal can transmit the image frames to the receiving terminal through a wireless link. Prior to receiving the image frames sent from the transmitting terminal, the receiving terminal may have established a communication link with the transmitting terminal or directly with the image device of the transmitting terminal.

In some embodiments, at 330, once the feedback message indicates the reception error, the first image frame may be encoded according to the preset error correction mechanism to generate the encoding data of the first image frame. The encoding data of the first image frame may include at least the intra-frame encoding data of a partial picture of the first image frame.

The partial picture of the image frame consistent with the present disclosure may refer to a picture size of the image frame and is unrelated to data information of the image frame. For example, when the entire picture of an image frame is divided into five small blocks, any one of the five blocks may be referred to as a partial picture of the image frame, and the five partial pictures may together constitute the full picture of the image frame.

In some embodiments, the encoding data of the first image frame may include the intra-frame encoding data of the full picture of the first image frame.

In some embodiments, once the feedback message indicates that the image frame experiences the reception error, the intra-frame encoding data of the current image frame may be sent to the receiving terminal. In other words, consistent with the disclosure, the intra-frame encoding will not be used unless the data is transmitted incorrectly, which can effectively improve the channel utilization as compared to the existing technologies, preventing the error from spreading out and thus accomplishing the error correction.

The encoding data of the first image frame consistent with the present disclosure may include the intra-frame encoding data of the full picture of the first image frame. The encoding data of the first image frame may be referred to as an error tolerant frame. The encoding mechanism using the error tolerant frame may be referred to as an error-tolerant-frame error correction mechanism.

In some embodiments, the encoding data of the first image frame may include the intra-frame encoding data of a partial picture of the first image frame and the inter-frame encoding data of the remaining partial picture(s) of the first image frame.

After the encoding data of the first image frame has been sent to the receiving terminal (340), the image processing method 300 may further include sending the encoding data of M image frames to the receiving terminal. The encoding data of each of the M image frames may include the intra-frame encoding data of a partial picture of the image frame and the inter-frame encoding data of the remaining partial picture(s) of the image frame. Among the M+1 image frames including the M image frames and the first image frame, the partial picture of the i-th image frame for the intra-frame encoding may be different from the partial picture of the j-th image frame for the intra-frame encoding, and the combination of the M+1 partial pictures for the intra-frame encoding may constitute a full picture, where M, i, and j are positive integers, $1 \leq i \leq M+1$, $1 \leq j \leq M+1$, and $i \neq j$. Hereinafter, the M image frames being processed and sent by the transmitting terminal are also referred to "M second to-be-sent image frames" or "M second target image frames."

For details, reference can be made to the above description in connection with FIG. 4, which are not repeated herein.

The image processing method 300 can improve the channel utilization by sending the intra-frame encoding data of a partial picture of the first image frame and the inter-frame encoding data of the remaining partial picture(s) of the first image frame.

The encoding data of the first image frame consistent with the present disclosure and the encoding data of the M image frame(s) consistent with the present disclosure may be referred to as an error-tolerant frame group. The encoding mechanism using the error-tolerant frame group may be referred to as an error-tolerant-frame-group error correction mechanism.

FIG. 5 illustrates a flowchart of another example image processing method 400 consistent with disclosed embodiments. As shown in FIG. 5, the image processing method 400 includes: at 410, receiving the feedback message sent by the receiving terminal according to the feedback time interval between sending two adjacent feedback messages by the receiving terminal; at 420, acquiring the first image frame; at 430, encoding the first image frame according to the preset error correction mechanism to generate the encoding data of the first image frame, if the feedback message indicates the reception error, and the interval between the frame number of the first image frame and the frame number of a second image frame is greater than or equal to the feedback time interval, in which the second image frame is the last image frame encoded according to the preset error correction mechanism before the transmitting terminal acquires the first image frame and sent from the transmitting terminal to the receiving terminal; and at 440, sending the encoding data of the first image frame to the receiving terminal.

In some embodiments, at 410, the receiving terminal may send the feedback message to the transmitting terminal at a first time, and the feedback time interval is the interval between the first time and a second time when the receiving terminal sent the feedback message to the transmitting terminal last time.

In some embodiments where the feedback message is sent to the transmitting terminal according to the feedback time interval, the feedback time interval may be constant or variable.

For example, the feedback time interval may be preset as fixed and constant. For another example, according to experience, the feedback time intervals can be preset to correspond to different periods of a day, and the feedback message can be sent at a feedback time interval corresponding to each period. For another example, according to experience, the feedback time intervals can be preset to correspond to different positions where the receiving terminal is located, and the feedback time interval corresponding to the current position may be used, where the receiving terminal is located.

For another example, after every certain period of time, a new time interval may be determined according to current actual situations or actual situations within a certain historical period of time, and may be used as the feedback time interval for the current period of time. The period of time may be fixed or variable. The certain historical period of time may be the last or the last few feedback time intervals, or may be the last or the last few periods of time. For another example, each time the receiving terminal sends out a feedback message, the time to send the next feedback message may be determined according to the current actual situations or the certain historical period of time. The certain historical period of time may be the last or the last few feedback time intervals.

There may be various approaches for determining the feedback time interval according to actual situations.

For example, with a stable communication channel, the receiving terminal may send the feedback message to the transmitting terminal at a longer feedback time interval, thereby lowering the channel's load; with a poor communication channel, the receiving terminal may send the feedback message to the transmitting terminal at a shorter feedback time interval, which can ensure the reliability in transmitting the image frames.

For another example, the receiving terminal may send the feedback message to the transmitting terminal by using a feedback time interval F1 within a period of time P1. The receiving terminal may send the feedback message to the transmitting terminal by using a feedback time interval F2 within a period of time P2 after the period of time P1. The feedback time interval F1 may differ from the feedback time interval F2. In some embodiments, the period of time P1 and the period of time P2 can be preset by a system or a user.

For another example, the feedback time interval may be dynamically determined according to at least one piece of the following information: the feedback channel load, the instant requirements for the error correction at application scenarios, or the transmission status of historical data. In some embodiments, if the transmitting terminal is a UAV, the feedback time interval may be dynamically determined according to attitude information of the transmitting terminal.

In some embodiments, the feedback time interval may be determined in accordance with the feedback channel load. For example, if the feedback channel load reaches a threshold, the feedback time interval may be lengthened, while if the feedback channel load is less than the threshold, the feedback time interval may be shortened.

In some embodiments, the feedback time interval may be determined according to the instant requirements for the error correction at application scenarios. For example, the instant requirements for the error correction at application scenarios may be that at least three of the five transmitted image frames of the coded data should be correct. In actual transmission, if the transmission accuracy reaches 60% (i.e., ⅗), the feedback time interval may be lengthened. If the transmission accuracy is less than 60%, the feedback time interval may be shortened.

In some embodiments, the feedback time interval may be determined according to the transmission status of historical data. For example, if the number of the consecutive feedback messages in a preset period of time that indicate the transmission error, is less than a first preset value, or if the total number of the feedback messages of a preset period of time that indicate the transmission error is less than a second preset value, the feedback time interval could be lengthened. If the number of the consecutive feedback messages in the preset period of time that indicate the transmission error is not less than the first preset value, or if the total number of the feedback messages in the preset period of time that indicate the transmission error is not less than the second preset value, the feedback time interval could be shortened.

In some embodiments, if the transmitting terminal is a movable device (e.g., a UAV), the feedback time interval may also be determined according to the attitude information of the transmitting terminal. The attitude information may include but is not limited to three-dimensional (3D) position, 3D angle, 3D velocity, 3D acceleration, and/or 3D angular velocity. For example, if the 3D velocity of the transmitting terminal is relatively high, which indicates a relatively large change among images captured at the transmitting terminal, the feedback time interval could be shortened. For another example, if the 3D velocity of the transmitting terminal is relatively low (e.g., the 3D velocity is 0), which indicates a relatively small change among the images captured at the transmitting terminal (e.g., the captured images are almost identical), the feedback time interval could be lengthened.

In some embodiments, the transmitting terminal may determine the attitude information according to the attitude information measured by a sensing system of the transmitting terminal. The attitude information of the transmitting terminal may include at least one piece of the following information: 3D position, 3D angle, 3D velocity, 3D acceleration, or 3D angular velocity. The sensing system of the transmitting terminal may include at least one of a gyroscope, an electronic compass, an inertial measurement unit (IMU), a visual sensor, a global positioning system (GPS), or a barometer.

The receiving terminal consistent with the present disclosure may send the feedback message to the transmitting terminal by using a variable feedback time interval, which can reduce the channel load to a certain extent.

In some embodiments, the feedback time interval may be determined by the transmitting terminal according to one or more of the five factors mentioned above. The determined feedback time interval may be sent to the receiving terminal by the transmitting terminal. The receiving terminal may send the feedback message according to the feedback time interval received.

In other words, after every feedback message has been sent by the receiving terminal, the time point (i.e., the abovementioned preset feedback time point) to send the next feedback message could be determined. At the preset feedback time point, the feedback message may be sent to the transmitting terminal. In these embodiments, the feedback message sent by the receiving terminal may be or not be the first feedback message, which depends on reception state of the image frame sent by the transmitting terminal that is detected by the receiving terminal.

In some embodiments, the feedback time interval may be directly determined by the receiving terminal according to one or more pieces of the following information: the feedback channel load, the instant requirements for the error correction at application scenarios, and the transmission status of historical data.

For specific methods, reference can be made to the foregoing description, which will not be repeated herein.

In some embodiments, the feedback time interval may be determined by negotiation between the transmitting terminal and the receiving terminal.

In some embodiments, the receiving terminal may determine the feedback time interval F1 according to at least one piece of the following information: feedback channel load, instant requirements for the error correction at application scenarios, or transmission status of historical data. The receiving terminal may receive the feedback time interval F2 sent by the transmitting terminal. The receiving terminal may determine the feedback time interval F3 according to the feedback time interval F1 and the feedback time interval F2. For example, the feedback time interval determined by the receiving terminal according to the feedback channel load can be denoted as a first interval, and the feedback time interval received by the receiving terminal that is determined by the transmitting terminal according to the attitude information of the transmitting terminal can be denoted as a second interval. Further, the preset arrangement may be that the receiving terminal uses the second interval as the feedback time interval if the first interval is longer than the second interval. Then, when the first interval determined by the receiving terminal is longer than the second interval determined by the transmitting terminal, the second interval may be used as the final feedback time interval.

The receiving terminal consistent with the present disclosure may send the feedback message to the transmitting terminal by using a variable feedback time interval, which can improve the channel utilization to a certain extent.

In some embodiments, at 430, the interval between the frame number of the first image frame and the frame number of the second image frame may be greater than the sum of the feedback time interval and a round trip time (RTT).

The interval between the frame number of the first image frame and the frame number of the second image frame may reflect the interval between sending the first image frame and sending the second image frame.

In some embodiments, according to the duration of the feedback time interval, the transmitting terminal can take protective measures to ensure that the interval between sending the two adjacent image frames that were encoded according to the preset error correction mechanism is longer than the feedback time interval of the receiving terminal sending the feedback messages, which can avoid sending the unnecessary intra-frame encoding data to waste channel resources and thus can improve the channel utilization.

In the foregoing embodiments, when the feedback message indicates the reception error, the feedback message may indicate that the encoding data of the image frame encoded according to the preset error correction mechanism and sent by the transmitting terminal has not been correctly received before the receiving terminal sends the feedback message and after the last detection of the reception error of the image frame sent by the transmitting terminal.

For more details, reference can be made to the description above in connection with FIG. 2.

In some embodiments, when the receiving terminal detects the reception error, the receiving terminal may configure the feedback message to indicate the reception error. When the receiving terminal correctly receives the encoding data of the image frame encoded according to the preset error correction mechanism, the receiving terminal may configure the feedback message to indicate the correct reception. After receiving the feedback message indicating the reception error, the transmitting terminal may encode the to-be-sent image frame by using the preset error correction mechanism (e.g., the error-tolerant-frame mechanism or the error-tolerant-frame-group mechanism). The receiving terminal may receive the image frame encoded according to the preset error correction mechanism and correct the error of the subsequent to-be-decoded image frame, which can ensure the reliability in transmitting the image frame between the transmitting terminal and the receiving terminal.

In some embodiments, the imaging processing method 400 may further include sending the inter-frame encoding data of the first image to the receiving terminal when the feedback message indicates the correct reception.

In some embodiments, when the feedback message indicates the correct reception, the feedback message may specify that the encoding data of the image frame encoded according to the preset error correction mechanism and sent by the transmitting terminal has been correctly received before the receiving terminal sends the feedback message and after the last detection of the reception error of the image frame sent by the transmitting terminal.

For more details, reference can be made to the above description in connection with FIG. 3.

In some embodiments, when the receiving terminal detects the reception error, the receiving terminal may configure the feedback message to indicate the reception error. When the receiving terminal correctly receives the encoding data of the image frame encoded according to the preset error correction mechanism, the receiving terminal may configure the feedback message to indicate the correct reception. After receiving the feedback message indicating the reception error, the transmitting terminal may encode the to-be-sent image frame by using the preset error correction mechanism (e.g., the error-tolerant-frame mechanism or the error-tolerant-frame-group mechanism). The receiving terminal may receive the image frame encoded according to the preset error correction mechanism and correct the error of the subsequent to-be-decoded image frame, which can ensure the reliability in transmitting the image frame between the transmitting terminal and the receiving terminal.

In some embodiments, before the feedback message is received that was sent by the receiving terminal at 310, the image processing method 400 may further include: packing the encoding data of a third image frame to generate a data packet, which includes a packet sequence number and/or a check code; and sending the data packet to the receiving terminal.

In some embodiments, the receiving terminal may generate the feedback message according to the reception state of the third image frame. For example, if it is determined that the encoding data of the image frame encoded according to the preset error correction mechanism and sent by the transmitting terminal has not been received before the receiving terminal sends the feedback message and after the last detection of the reception error of the image frame sent by the transmitting terminal, then the feedback message may be generated to indicate the reception error. If it is determined that the encoding data of the image frame encoded according to the preset error correction mechanism and sent by the transmitting terminal has been received before the receiving terminal sends the feedback message and after the last detection of the reception error of the image frame sent by the transmitting terminal, then the feedback message may be generated to indicate the correct reception.

In some embodiments, the receiving terminal may determine whether the data loss occurs to the third image frame according to the continuity of the packet sequence number of the data packet. If the packet sequence number is discontinuous, it may indicate that the data has lost, such that the receiving terminal may determine that the reception error of the third image frame occurred. In some embodiments, the receiving terminal may determine whether the third image frame has not been correctly received according to the check code carried by the data packet. If the check value of the data of the data packet is not consistent with the check code carried by the data packet, it may indicate that the data has lost, such that the receiving terminal may determine that the reception error of the third image frame occurred.

In some embodiments, the packet sequence number of the third image frame may correspond to the frame number of the third image frame.

FIGS. 6A-6D illustrate a flowchart of another example image processing method 500 consistent with disclosed embodiments. To better understand the image processing method 500, the image processing method 500 will be described below in connection with FIGS. 6A-6D from the perspective of interaction between the transmitting terminal and the receiving terminal.

At 511, according to the reception state of the image frame sent by the transmitting terminal and received by the receiving terminal, the receiving terminal determines that the encoding data of the image frame encoded according to the preset error correction mechanism and sent by the transmitting terminal is not correctly received after the last detection of the reception error of the image frame sent by the transmitting terminal.

At 512, the receiving terminal generates the feedback message to indicate the reception error, according to the determined result of 511.

At 513, the receiving terminal sends the feedback message generated at 512 to the transmitting terminal. In some embodiments, the receiving terminal can send the feedback message according to the feedback time interval.

At 514, the transmitting terminal acquires the first image frame to be encoded and sent.

At 515, the transmitting terminal determines whether the interval between the frame number of the first image frame and the frame number of the second image frame is greater than or equal to the feedback time interval, by which the receiving terminal sends the feedback messages. If so (515: Yes), the process proceeds to 516. If not (515: No), the process proceeds to 518.

At 516, the transmitting terminal encodes the first image frame to generate the encoding data of the first image frame, according to the preset error correction mechanism.

At 517, the transmitting terminal sends the encoding data of the acquired first image frame of 516 to the receiving terminal.

At 518, the transmitting terminal encodes the first image frame via the inter-frame encoding to generate the inter-frame encoding data of the first image frame.

At 519, the transmitting terminal sends the inter-frame encoding data of the first image frame obtained at 518 to the receiving terminal.

At 520, according to the reception state of the image frame sent by the transmitting terminal and received by the receiving terminal, the receiving terminal determines whether the encoding data of the image frame encoded according to the preset error correction mechanism and sent by the transmitting terminal is correctly received after the last detection of the reception error of the image frame sent by the transmitting terminal.

At 521, according to the determined result of 520, the receiving terminal generates the feedback message to indicate the correct reception.

At 522, the receiving terminal sends the feedback message generated at 521 to the transmitting terminal according to the feedback time interval.

At 523, the transmitting terminal acquires the first image frame to be encoded and sent.

At 524, the transmitting terminal encodes the first image frame via the inter-frame encoding to generate the inter-frame encoding data of the first image frame.

At 525, the transmitting terminal sends the inter-frame encoding data of the first image frame generated at 524 to the receiving terminal.

For detailed description of 511 and 512, reference can be made to the description above in connection with FIG. 2.

For detailed description of 513, reference can be made to the description of 120 above in connection with FIG. 1.

In some embodiments, after receiving the feedback message, the transmitting terminal can recognize that the reception state of the image frame sent by the transmitting terminal and received by the receiving terminal before the receiving terminal sends the feedback message is reception error state.

In some embodiments, the encoding data of the first image frame may include at least the intra-frame encoding data of a partial picture of the first image frame. For example, if the transmitting terminal applies the error-tolerant-frame error correction mechanism to process the first image frame, the encoding data of the first image frame may include the intra-frame encoding data of the full picture of the first image frame. If the transmitting terminal applies the error-tolerant-frame-group error correction mechanism to process the first image frame, the encoding data of the first image frame may include the intra-frame encoding data of a partial picture and the inter-frame encoding data of the remaining partial picture(s) of the first image frame. After the encoding data of the first image frame is sent to the receiving terminal, the encoding data of M image frames may be also sent to the receiving terminal. The encoding data of each of the M image frames may include the intra-frame encoding data of a partial picture and the inter-frame encoding data of the remaining partial picture(s). Among the M+1 image frames including the M image frames and the first image frame, the partial picture of the i-th image frame for the intra-frame encoding may be different from the partial picture of the j-th image frame for the intra-frame encoding, and the combination of the M+1 partial pictures for the intra-frame encoding may constitute a full picture, where M, i, and j are positive integers, $1 \leq i \leq M+1$, $1 \leq j \leq M+1$, and $i \neq j$.

If the receiving terminal determines that the encoding data of the image frame encoded according to the preset error correction mechanism and sent by the transmitting terminal has not been correctly received after the last detection of the reception error of the image frame sent by the transmitting terminal according to the reception state of the image frame sent by the transmitting terminal and received by the receiving terminal, then the corresponding scheme may be given by 511 through 519 as shown in FIGS. 6A-6D.

If the receiving terminal determines that the encoding data of the image frame encoded according to the preset error correction mechanism and sent by the transmitting terminal has been correctly received after the last detection of the reception error of the image frame sent by the transmitting terminal according to the reception state of the image frame sent by the transmitting terminal and received by the receiving terminal, then the corresponding scheme may be given by 520 through 525 as shown in FIGS. 6A-6D.

For detailed description of 520 and 521, reference can be made to the description above in connection with FIG. 3.

For detailed description of 522, reference can be made to the description of 120 above in connection with FIG. 2.

In some embodiments, after receiving the feedback message, the transmitting terminal may recognize that the reception state of the image frame sent by the transmitting terminal and received by the receiving terminal before the receiving terminal sends the feedback message is the correct reception state.

Although examples are given above to describe one transmission and reception period between the transmitting terminal and the receiving terminal in connection with FIGS. 1-6D, the present disclosure is not limited thereto. The image processing method consistent with the present disclosure can be applied to any one of the transmission and reception periods or each of the transmission and reception periods. For example, as shown in FIGS. 6A-6D, from the perspective of the transmitting terminal, the image processing method consistent with the present disclosure returns to 513 or 514 after 517 or 519, returns to 522 or 523 after 525, and repeats the cycle. From the other perspective of the receiving terminal, the image processing method consistent with the present disclosure returns to 511 after 517 or 519, returns to 520 after 525, and repeats the cycle.

Overall, in some embodiments, during the transmission of the encoding data of the image frame to the receiving terminal, the transmitting terminal may not send the encoding data of the image frame encoded according to the preset error correction mechanism to the receiving terminal until the feedback message indicating the reception error sent by the receiving terminal is received. Compared to the existing technologies where the encoding data of the image frame encoded according to the preset error correction mechanism is periodically transmitted regardless of the reception state of the transferred data, the image processing method consistent with the present disclosure can effectively improve the channel utilization.

In some embodiments, the intra-frame encoding may be an encoding algorithm to generate an I-frame. In some embodiments, the inter-frame encoding may be an encoding algorithm to generate a P-frame or a B-frame. The P-frame including only code for the different part may be generated by referring to a preceding I-frame. The B-frame including only code for the different part may be generated by referring to a preceding I-frame and a subsequent I-frame.

The transmitting terminal consistent with the present disclosure may be an image processing device of a UAV. The receiving terminal consistent with the present disclosure may be a mobile phone, a tablet computer, a wearable device, or a remote controller of a UAV.

The image processing method consistent with the present disclosure is described above in connection with FIGS. 1-6D. The image processing device consistent with the present disclosure will be described below in connection with FIGS. 7 to 11.

Figure 7:
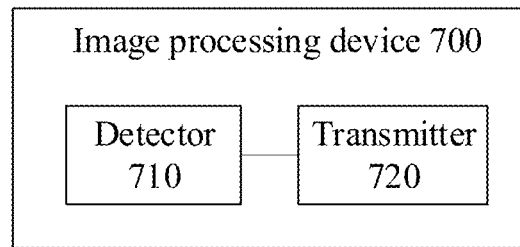
FIG. 7 illustrates a schematic block diagram of an example image processing device consistent with disclosed embodiments.

FIG. 7 illustrates a schematic block diagram of an example image processing device 700 consistent with disclosed embodiments. In some embodiments, the image processing device 700 may be the receiving terminal consistent with the present disclosure. In some embodiments, the image processing device 700 may be arranged at the receiving terminal consistent with the present disclosure.

As shown in FIG. 7, the image processing device 700 includes a detector 710 configured to detect whether a reception error occurs to an image frame sent by the transmitting terminal, and a transmitter 720 configured to send a first feedback message to the transmitting terminal indicating the reception error of the image frame sent by the transmitting terminal when the reception error is detected.

In some embodiments, during the transmission of the encoding data of the image frame from the transmitting terminal to the image processing device 700, the image processing device 700 may send the feedback message indicating the reception error to the transmitting terminal when the reception error is detected, which allows the transmitting terminal to recognize in time that the reception state of the sent image frame is the reception error state and allows the transmitting terminal to take corresponding measures to correct the error, thus ensuring the reliability in transmitting the image frame.

In some embodiments, the transmitter 720 may send the feedback message to the transmitting terminal when the preset feedback time point is reached. The feedback message may be the first feedback message at the detection of the reception error.

In some embodiments, the time interval between any two adjacent preset feedback time points may be constant or variable.

In some embodiments, if the encoding data of the image frame encoded according to the preset error correction mechanism and sent by the transmitting terminal has not been correctly received before the preset feedback time point and after the last detection of the reception error of the image frame sent by the transmitting terminal, then the feedback message may be the first feedback message.

In some embodiments, the transmitter 720 may also send the first feedback message at the next preset feedback time point, after the first feedback message has been sent to transmitting terminal and before the next preset feedback time point of the preset feedback time point, if the encoding data of the image frame encoded according to the preset error correction mechanism and sent by the transmitting terminal has not been correctly received.

In some embodiments, if the encoding data of the image frame encoded according to the preset error correction mechanism and sent by the transmitting terminal has been correctly received before the preset feedback time point and after the last detection of the reception error of the image frame sent by the transmitting terminal, the feedback message may be a second feedback message indicating the correct reception of the image frame sent by the transmitting terminal.

In some embodiments, the transmitter 720 may send the first feedback message to the transmitting terminal when the reception error of the image frame sent by the transmitting terminal is detected.

In some embodiments, the transmitter 720 may send the first feedback message to the transmitting terminal if the reception error of the image frame sent by the transmitting terminal has been detected and if a first preset time length has elapsed after the detection of the reception error.

In some embodiments, the transmitter 720 may send the first feedback message to the transmitting terminal, if the reception error of the image frame sent by the transmitting terminal has been detected, if the first preset time length has been reached after the detection of the reception error, and if a second preset time length is reached after the last transmission of the feedback message.

In some embodiments, the first preset time length may be constant or variable.

In some embodiments, the second preset time length may be constant or variable.

In some embodiments, the transmitter 720 may send the first feedback message to the transmitting terminal after the last feedback message has been sent to the transmitting terminal, if the reception error of the image frame sent by the transmitting terminal has been detected for the first time, and if the first preset time length is reached after the first detection of the reception error.

In some embodiments, the image processing device 700 may further include a first receiver, which receives the encoding data of the first image frame sent by the transmitting terminal after the transmitter 720 has sent the first feedback message to the transmitting terminal. The encoding data of the first image frame may be obtained according to the preset error correction mechanism.

In some embodiments, the encoding data of the first image frame may include at least the intra-frame encoding data of a partial picture of the first image frame. The encoding data of the first image frame may be encoded according to the preset error correction mechanism.

In some embodiments, the encoding data of the first image frame may include the intra-frame encoding data of a partial picture and the inter-frame encoding data of the remaining partial picture(s) of the first image frame.

The first receiver may receive the encoding data of M image frames sent by the transmitting terminal, and determine whether the encoding data of the image frame encoded according to the preset error correction mechanism and sent by the transmitting terminal is correctly received, after receiving the encoding data of the first image frame sent by the transmitting terminal.

The encoding data of each of the M image frames may include the intra-frame encoding data of a partial picture and the inter-frame encoding data of the remaining partial picture(s). Among the M+1 image frames including the M image frames and the first image frame, the partial picture of the i-th image frame for the intra-frame encoding may be different from the partial picture of the j-th image frame for the intra-frame encoding, and the combination of the M+1 partial pictures for the intra-frame encoding may constitute a full picture, where M, i, and j are positive integers, $1 \leq i \leq M+1$, $1 \leq j \leq M+1$, and $i \neq j$.

In some embodiments, when the encoding data of the first image frame includes the intra-frame encoding data of the full picture of the first image frame, the first receiver may determine whether the encoding data of the image frame has been correctly received that was sent by the transmitting terminal and encoded according to the preset error correction mechanism.

In some embodiments, the time interval between any two adjacent preset feedback time point may be variable. The variable feedback time interval may be dynamically determined according to at least one piece of the following information: the feedback channel load, the instant requirements for the error correction at application scenarios, or the transmission status of historical data. In some embodiments, when the transmitting terminal is a UAV, the variable feedback time interval may be dynamically determined according to the attitude information of the transmitting terminal.

In some embodiments, the image processing device 700 may further include a second receiver, which receives the data packet sent by the transmitting terminal before the detector 710 detects whether the image frame sent by the transmitting terminal is not correctly received. The data packet may be obtained after the transmitting terminal packs the encoding data of the second image frame and may include a packet sequence number and/or a check code.

The detector 710 may detect whether the image frame sent by the transmitting terminal is not correctly received according to the packet sequence number and/or the check code.

In some embodiments, the image processing device 700 may be any one of the following devices: a UAV remote controller, a mobile phone, a tablet computer, and a wearable device.

In some embodiments, the detector 710 may be implemented by a processor or a processor-related circuit, the transmitter 720 may be implemented by a transmitter or a transmitter-related circuit, and the receiver may be implemented by a receiver or a receiver-related circuit.

Figure 8:
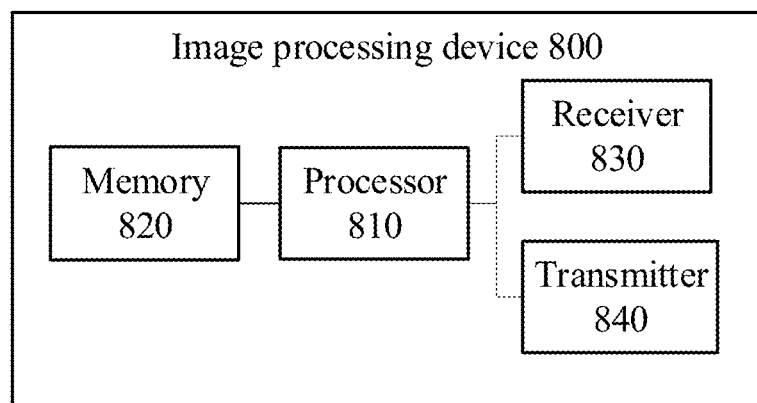
FIG. 8 illustrates a schematic block diagram of another example image processing device consistent with disclosed embodiments.

FIG. 8 illustrates a schematic block diagram of another example image processing device 800 consistent with disclosed embodiments. As shown in FIG. 8, the image processing device 800 includes a processor 810, a memory 820, a receiver 830, and a transmitter 840. The processor 810, the memory 820, the receiver 830, and the transmitter 840 communicate with each other via an internal connection. The memory 820 may store instructions and the processor 810 may execute the instructions stored by the memory 820 to control the receiver 830 to receive signals and also control the transmitter 840 to transmit signals. The processor 810 may detect whether the image frame sent by the transmitting terminal is not correctly received. When reception error is detected, the transmitter 540 may send a first feedback message to the transmitting terminal indicating that the image frame sent by the transmitting terminal has not been correctly received.

In some embodiments, during the transmission of the encoding data of the image frame from the transmitting terminal to the image processing device 800, once the reception error is detected by the image processing device 800, the feedback message indicating the reception error may be sent to the transmitting terminal, which allows the transmitting terminal to recognize in time that the reception state of the sent image frame is the reception error state and allows the transmitting terminal to take corresponding measures to correct the error, thus ensuring the reliability in transmitting the image frame.

In some embodiments, the transmitter 840 may send the first feedback message to the transmitting terminal, if the preset feedback time point is reached and the reception error is detected.

In some embodiments, the time interval between any two adjacent preset feedback time points may be constant or variable.

In some embodiments, the transmitter 840 may send the first feedback message to the transmitting terminal, if the encoding data of the image frame encoded according to the preset error correction mechanism and sent by the transmitting terminal is not correctly received, before the preset feedback time point and after the last detection of the reception error of the image frame sent from the transmitting terminal.

In some embodiments, the transmitter 840 may also send the first feedback message to the transmitting terminal at the next preset feedback time point, if the encoding data of the image frame encoded according to the preset error correction mechanism and sent by the transmitting terminal is not correctly received, after the first feedback message has been sent to the transmitting terminal and before the next preset feedback time point.

In some embodiments, the transmitter 840 may send a second feedback message to the transmitting terminal indicating that the image frame sent by the transmitting terminal has been correctly received, if the encoding data of the image frame encoded according to the preset error correction mechanism and sent by the transmitting terminal is correctly received, before the preset feedback time point and after the last detection of the reception error of the image frame sent from the transmitting terminal.

In some embodiments, the transmitter 840 may send the first feedback message to the transmitting terminal when the reception error of the image frame sent by the transmitting terminal is detected.

In some embodiments, the transmitter 840 may send the first feedback message to the transmitting terminal, if the reception error of the image frame sent by the transmitting terminal has been detected, and if a first preset time length is reached after the detection of the reception error.

In some embodiments, the transmitter 840 may send the first feedback message to the transmitting terminal, if the reception error of the image frame sent by the transmitting terminal has been detected, if the first preset time length has been reached after the detection of the reception error, and if a second preset time length is reached after the last transmission of the feedback message.

In some embodiments, the first preset time length may be constant or variable.

In some embodiments, the second preset time length may be constant or variable.

In some embodiments, the transmitter 840 may send the first feedback message to the transmitting terminal after the last transmission of the feedback message to the transmitting terminal, if the reception error of the image frame sent by the transmitting terminal has been detected for the first time, and if the first preset time length is reached after the first detection of the reception error.

In some embodiments, after the first feedback message has been sent to the transmitting terminal, the receiver 830 may receive the encoding data of a first image frame sent by the transmitting terminal. The encoding data of the first image frame may be encoded according to the preset error correction mechanism.

In some embodiments, the encoding data of the first image frame may include at least the intra-frame encoding data of a partial picture of the first image frame. The encoding data of the first image frame may be encoded according to the preset error correction mechanism.

In some embodiments, the encoding data of the first image frame may include the intra-frame encoding data of a partial picture and the inter-frame encoding data of the remaining partial picture(s) of the first image frame.

In some embodiments, the receiver 830 may also receive the encoding data of M image frames sent by the transmitting terminal, and determine whether the encoding data of the image frame encoded according to the error correction mechanism and sent by the transmitting terminal is correctly received, after receiving the encoding data of the first image frame sent by the transmitting terminal.

The encoding data of each of the M image frames may include the intra-frame encoding data of a partial picture and the inter-frame encoding data of the remaining partial picture(s). Among the M+1 image frames including the M image frames and the first image frame, the partial picture of the i-th image frame for the intra-frame encoding may be different from the partial picture of the j-th image frame for the intra-frame encoding, and the combination of the M+1 partial pictures for the intra-frame encoding may constitute a full picture, where M, i and j are positive integers, $1 \leq i \leq M+1$, $1 \leq j \leq M+1$, and $i \neq j$.

In some embodiments, when the encoding data of the first image frame includes the intra-frame encoding data of the entire picture of the first image frame, the receiver 830 may determine whether the encoding data of the image frame encoded according to the preset error correction mechanism and sent by the transmitting terminal is correctly received.

In some embodiments, the time interval between any two adjacent preset feedback time points may be variable.

In some embodiments, the variable feedback time interval may be dynamically determined according to at least one piece of the following information: feedback channel load, instant requirements for the error correction at application scenarios, or transmission status of historical data.

In some embodiments, if the transmitting terminal is a UAV, the variable feedback time interval may be dynamically determined according to attitude information of the transmitting terminal.

In some embodiments, the receiver 830 may also receive a data packet sent by the transmitting terminal and generated from packing the encoding data of the second image frame by the transmitting terminal, before determining whether the encoding data of the image frame sent by the transmitting terminal is not correctly received. The data packet may include a packet sequence number and/or a check code.

The processor 810 may determine whether the image frame sent by the transmitting terminal is not correctly received according to the packet sequence number and/or the check code.

In some embodiments, the image processing device 800 may be one of the following devices: a UAV remote controller, a mobile phone, a tablet computer, or a wearable device.

The image processing device 800 may correspond to the receiving terminal of the image processing method consistent with the present disclosure, and may correspond to the image processing device 700. The foregoing operations and/or functions of each of components of the image processing device 800 may respectively correspond to the corresponding processes of the foregoing image processing method consistent with the present disclosure. For brevity, no further description is provided herein.

Figure 9:
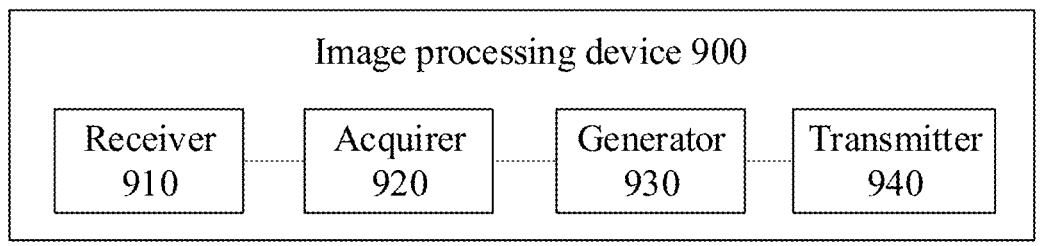
FIG. 9 illustrates a schematic block diagram of another example image processing device consistent with disclosed embodiments.

FIG. 9 illustrates a schematic block diagram of another example image processing device 900 consistent with disclosed embodiments. In some embodiments, the image processing device 900 may be the transmitting terminal consistent with the present disclosure. In some embodiments, the image processing device 900 may be located at the transmitting terminal consistent with the present disclosure. As shown in FIG. 9, the image processing device 900 includes: a receiver 910, receiving the feedback message sent by the transmitting terminal indicating the reception state of the received image frame sent from the image processing device before the receiving terminal sends out the feedback message; an acquirer 920, acquiring the first image frame; a generator 930, generating the encoding data of the first image frame according to the preset error correction mechanism when the feedback message indicates the reception error; and a transmitter 940, sending the encoding data of the first image frame to the receiving terminal.

In some embodiments, during the transmission of the encoding data of the image frame from the image processing device 900 to the receiving terminal, only when the feedback message is received that was sent by the receiving terminal and that indicates the reception error, the image processing device 900 may send the encoding data of the image frame encoded according to the preset error correction mechanism to the receiving terminal. Compared to the existing technologies, whereby the encoding data of the image frame encoded according to the preset error correction mechanism is periodically transmitted regardless of the reception state of the transferred data, the image processing device 900 can effectively improve the channel utilization.

In some embodiments, the receiver 910 may receive the feedback message sent by the receiving terminal according to a feedback time interval between two adjacent time points at which the receiving terminal sends the feedback messages.

In some embodiments, the generator 930 may encode the first image frame to generate the encoding data of the first image frame according to the preset error correction mechanism, if the feedback message indicates the reception error, and the interval between the frame number of the first image frame and the frame number of the second image frame is greater than or equal to the feedback time interval. The second image frame may be the last image frame encoded according to the preset error correction mechanism and sent to the receiving terminal, before the image processing device 900 acquires the first image frame.

In some embodiments, when the feedback message indicates the reception error, the feedback message may specify that the receiving terminal has not correctly received the encoding data of the image frame, encoded by the error correction mechanism and sent by the image processing device 900, before sending the feedback message and after the last detection of the reception error of the image frame sent by the image processing device 900.

In some embodiments, if the encoding data of the first image frame is generated by encoding the first image frame according to the preset error correction mechanism, the encoding data of the first image frame would include at least the intra-frame encoding data of a partial picture of the first image frame.

In some embodiments, if the encoding data of the first image frame is generated by encoding the first image frame according to the preset error correction mechanism, the encoding data of the first image frame would include the intra-frame encoding data of a partial picture and the inter-frame encoding data of the remaining partial picture(s) of the first image frame.

In some embodiments, the transmitter 940 may also send the encoding data of M image frames to the receiving terminal after the encoding data of the first image frame has been sent to the receiving terminal. The encoding data of each of the M image frames may include the intra-frame encoding data of a partial picture and the inter-frame encoding data of the remaining partial picture(s). Among the M+1 image frames including the M image frames and the first image frame, the partial picture of the i-th image frame for the intra-frame encoding may be different from the partial picture of the j-th image frame for the intra-frame encoding, and the combination of the M+1 partial pictures for the intra-frame encoding may constitute a full picture, where M, i, and j are positive integers, $1 \leq i \leq M+1$, $1 \leq j \leq M+1$, and $i \neq j$.

In some embodiments, if the encoding data of the first image frame is generated by encoding the first image frame according to the preset error correction mechanism, the encoding data of the first image frame would include the intra-frame encoding data of the entire picture of the first image frame.

In some embodiments, when the feedback message indicates the correct reception, the transmitter 940 may also send the inter-frame encoding data of the first image frame to the receiving terminal.

In some embodiments, when the feedback message indicates the correct reception, the feedback message may specify that the receiving terminal has correctly received the encoding data of the image frame that was encoded by the error correction mechanism and sent by the image processing device 900, before sending the feedback message and after the last detection of the reception error of the image frame sent by the image processing device 900.

In some embodiments, the feedback time interval may be constant or variable.

In some embodiments, the feedback time interval may be variable and may be dynamically determined according to at least one piece of the following information: feedback channel load, instant requirements for the error correction at application scenarios, transmission status of historical data or attitude information of the image processing device 900. The attitude information of the image processing device 900 may be included when the image processing device is a mobile device.

In some embodiments, the image processing device 900 may further include a packager, which packs the encoding data of a third image frame and generates a data packet including a packet sequence number and/or a check code.

In some embodiments, the transmitter 940 may also send the data packet to the receiving terminal.

In some embodiments, the image processing device 900 may further include a visual sensor to capture image frames.

In some embodiments, the image processing device 900 may be arranged at the UAV.

The receiver 910 can be implemented by a receiver or a receiver-related circuit. The acquirer 920 and the generator 930 can be implemented by a processor or a processor-related circuit. The transmitter 940 can be implemented by a transmitter or a transmitter-related circuit.

Figure 10:
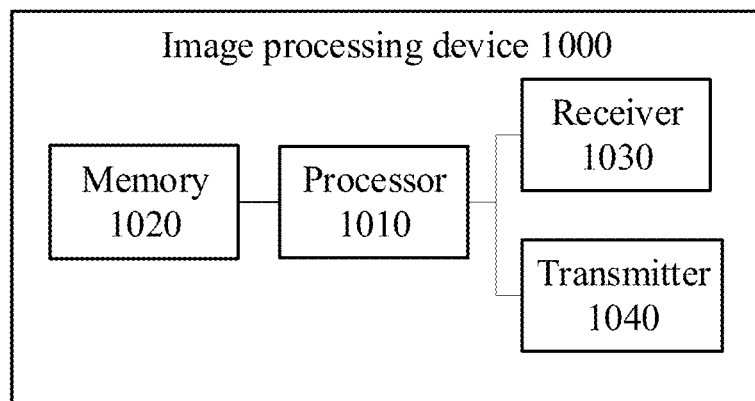
FIG. 10 illustrates a schematic block diagram of another example image processing device consistent with disclosed embodiments.

FIG. 10 illustrates a schematic block diagram of another example image processing device 1000 consistent with disclosed embodiments. As shown in FIG. 10, the image processing device 1000 includes a processor 1010, a memory 1020, a receiver 1030, and a transmitter 1040. The processor 1010, the memory 1020, the receiver 1030, and the transmitter 1040 may communicate with each other via an internal link. The memory 1020 may store instructions. The processor 1010 may execute the instructions stored by the memory 1020 to control the receiver 1030 to receive signals and control the transmitter 1040 to transmit signals. The receiver 1030 may receive the feedback message sent by the receiving terminal, which indicates the reception state of the received image frame sent by the image processing device 1000 before the receiving terminal sends the feedback message. When the feedback message indicates the reception error, the processor 1010 may acquire the first image frame, encode the first image frame according to the preset error correction mechanism, and generate the encoding data of the first image frame. The transmitter 1040 may send the encoding data of the first image frame to the receiving terminal.

In some embodiments, during the transmission of the encoding data of the image frame from the image processing device 1000 to the receiving terminal, the image processing device 1000 may not send the encoding data of the image frame encoded according to the preset error correction mechanism to the receiving terminal until the feedback message sent by the receiving terminal and indicating the reception error is received. Compared to the existing technologies, whereby the encoding data of the image frame encoded according to the preset error correction mechanism is periodically transmitted regardless of the reception state of the transferred data, the image processing device 1000 can effectively improve the channel utilization.

In some embodiments, the receiver 1030 may receive the feedback message sent by the receiving terminal according to the feedback time interval between two adjacent time points at which the receiving terminal sends the feedback messages.

In some embodiments, the processor 1010 may encode a first image frame according to the preset error correction mechanism and generate the encoding data of the first image frame, if the feedback message indicates the reception error, and the interval between the frame number of the first image frame and the frame number of a second image frame is greater than or equal to the feedback time interval. The second image frame may be the last image frame encoded according to the preset error correction mechanism and sent from the image processing device 1000 to the receiving terminal, before the image processing device 1000 acquires the first image frame.

In some embodiments, when the feedback message indicates the reception error, the feedback message may specify that the receiving terminal has not correctly received the encoding data of the image frame encoded according to the preset error correction mechanism and sent by the image processing device 1000, before sending the feedback message and after the last detection of the reception error of the image frame sent by the image processing device 1000.

In some embodiments, when the encoding data of the first image frame is encoded and generated from the first image frame according to the preset error correction mechanism, the encoding data of the first image frame may include at least the intra-frame encoding data of a partial picture of the first image frame.

In some embodiments, when the encoding data of the first image frame is encoded and generated from the first image frame according to the preset error correction mechanism, the encoding data of the first image frame may include the intra-frame encoding data of a partial picture and the inter-frame encoding data of the remaining partial picture(s) of the first image frame. The transmitter 1040 may also send the encoding data of M image frames to the receiving terminal after the encoding data of the first image frame has been sent to the receiving terminal. The encoding data of each of the M image frames may include the intra-frame encoding data of the partial picture and the inter-frame encoding data of the remaining partial picture(s). Among the M+1 image frames including the M image frames and the first image frame, the partial picture of the i-th image frame for the intra-frame encoding may be different from the partial picture of the j-th image frame for the intra-frame encoding, and the combination of the M+1 partial pictures for the intra-frame encoding may constitute a full picture, where M, i, and j are positive integers, $1 \leq i \leq M+1$, $1 \leq j \leq M+1$, and $i \neq j$.

In some embodiments, when the encoding data of the first image frame is encoded and generated from the first image frame according to the preset error correction mechanism, the encoding data of the first image frame may include the intra-frame encoding data of the entire picture of the first image frame.

In some embodiments, the transmitter 1040 may send the inter-frame encoding data of the first image frame to the receiving terminal.

In some embodiments, when the feedback message indicates the correct reception, the feedback message may specify that the receiving terminal has correctly received the encoding data of the image frame encoded according to the preset error correction mechanism and sent by the image processing device 1000, before sending the feedback message and after the last detection of the reception error of the image frame sent by the image processing device 1000.

In some embodiments, the feedback time interval may be constant or variable.

In some embodiments, the feedback time interval may be variable and may be dynamically determined according to at least one piece of the following information: feedback channel load, instant requirements for the error correction at application scenarios, transmission status of historical data or attitude information of the image processing device 1000.

The attitude information of the image processing device 1000 may be included when the image processing device is a mobile device.

In some embodiments, before the feedback message is received that was sent by the receiving terminal, the processor 1010 may pack the encoding data of a third image frame and generate a data packet including a packet sequence number and/or a check code. The transmitter 1040 may send the data packet to the receiving terminal.

In some embodiments, the image processing device 1000 may further include a visual sensor to capture image frames.

In some embodiments, the image processing device 1000 may be arranged at the UAV.

The image processing device 1000 may correspond to the transmitting terminal of the image processing method consistent with the present disclosure, and may correspond to the image processing device 900. The foregoing operations and/or functions of each of components of the image processing device 1000 may respectively correspond to the corresponding processes of the foregoing image processing method consistent with the present disclosure. For brevity, no further description is provided herein.

The processor consistent with the present disclosure may be a central processing unit (CPU). The processor may also be other general-purpose processors, digital signal processors (DSP), application specific integrated circuit (ASIC), field programmable gate array (FPGA), other programmable logic devices, discrete gate transistors, transistor logic devices, or discrete hardware components, etc. The general-purpose processors may be a micro-processor, or any conventional processors.

The memory consistent with the present disclosure may include a read-only memory and a random-access memory, and may provide instructions and data to the processor. A portion of the memory may also include a non-volatile random-access memory. For example, the memory can also store information on device types.

In implementation, the image processing methods described above can be processed and accomplished by integrated logic circuits of hardware of the processor, or by instructions in the form of software. The image processing method consistent with the present disclosure may be accomplished directly by hardware (e.g., processor) execution, or by a combined execution of both the processor hardware and software applications. The software applications can be arranged at a mature storage medium of the field, such as a random-access memory, a flash memory, a read-only memory, a programmable read-only memory, an electrically erasable programmable memory, and a register. The storage medium may be located at the memory, and the processor may read the information stored at the memory and implement the above methods. To avoid repetition, details are not further described herein.

Figure 11:
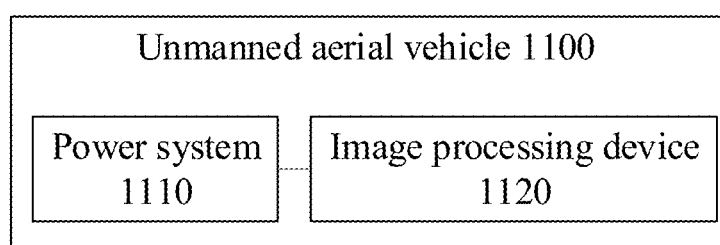
FIG. 11 illustrates a schematic block diagram of an example unmanned aerial vehicle consistent with disclosed embodiments.

FIG. 11 illustrates a schematic block diagram of an example UAV 1100 consistent with disclosed embodiments. As shown in FIG. 11, the UAV 1100 includes a power system 1110 and an image processing device 1120. The image processing device 1120 may correspond to the transmitting terminal consistent with the present disclosure, and may also correspond to the image processing device 900 or 1000. The power system 1110 may provide flight power to the UAV, drive the UAV to fly, and allow the image processing device 1120 to capture the image of a target.

The various numerical numbers involved in the present disclosure are distinguished merely for convenience of description and are not intended to limit the scope of the present disclosure.

In some embodiments, the magnitude of the sequence numbers of each of the processes does not imply a sequence of execution. The order of the execution of each of the processes should be determined by functions and intrinsic logic of each of the processes, and should not limit the implementation of the present disclosure.

Those skilled in the art should realize that the present disclosure can be implemented electronic hardware, or a combination of computer software and electronic hardware. Whether these functions are performed by hardware or software may depend on the specific applications and design constraints. Those skilled in the art can use different methods to achieve the described functions for each of the specific applications, but such achievement should not be considered to exceed the scope of the present disclosure.

The devices and methods disclosed in the present disclosure can be realized in other manners, and the above-described devices consistent with the present disclosure are merely illustrative. For example, the division of the components is merely a division of logical functions. In actual implementation, there may be another manner of division. For example, multiple components can be combined or integrated into another component, or some features may be omitted or not implemented.

In addition, in some embodiments, each of the functional components consistent with the present disclosure may be integrated into one processing unit. In some embodiments, each of the functional components may be physically and individually present at the respective processing unit. In some embodiments, two or more functional components may be integrated into one processing unit.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An image processing method comprising:
   receiving, by a transmitting terminal, a feedback message sent by a receiving terminal, the feedback message indicating a reception state of a received image frame sent by the transmitting terminal and received by the receiving terminal before the receiving terminal sends the feedback message;
   acquiring a first target image frame;
   in response to the feedback message indicating a reception error, encoding the first target image frame according to a preset error correction mechanism to generate encoding data of the first target image frame, the encoding data of the first target image frame including intra-frame encoding data of a first partial picture of the first target image and inter-frame encoding data of a first remaining partial picture of the first target image frame;
   sending the encoding data of the first target image frame to the receiving terminal; and
   sending encoding data of a plurality of second target image frames to the receiving terminal, the encoding data of the plurality of second target image frames including intra-frame encoding data of a plurality of second partial pictures, each second partial picture belonging to one of the plurality of second target image frames and being encoded by intra-frame encoding;
   wherein:
      locations of the plurality of second partial pictures in the plurality of second target image frames are different from each other and are different from the location of the first partial picture in the first target image frame; and
      a combination of the first partial picture and the plurality of second partial pictures constitutes a full picture.

2. The image processing method according to claim 1, wherein receiving the feedback message sent by the receiving terminal comprises:
   receiving the feedback message sent by the receiving terminal according to a feedback time interval, the feedback time interval indicating a time interval between the receiving terminal sending two adjacent feedback messages.

3. The image processing method according to claim 2, wherein encoding the first target image frame comprises:
   in response to the feedback message indicating the reception error and an interval between a frame number of the target image frame and a frame number of a last image frame being greater than or equal to the feedback time interval, encoding the first target image frame to generate the encoding data of the first target image frame, the last image frame being an image frame encoded according to the preset error correction mechanism and sent to the receiving terminal before the target image frame is acquired.

4. The image processing method according to claim 1, wherein the feedback message indicating the reception error indicates that no data encoded according to the preset error correction mechanism is correctly received by the receiving terminal after last time the receiving terminal detects an error in receiving image frames sent by the transmitting terminal and before the receiving terminal sends the feedback message.

5. The image processing method according to claim 1, wherein a combination of the first partial picture and the second partial picture constitutes a full picture.

6. The image processing method according to claim 1, further comprising:
   in response to the feedback message indicating a correct reception, sending inter-frame encoding data of the first target image frame to the receiving terminal.

7. The image processing method according to claim 6, wherein the feedback message indicating the correct reception indicates that data encoded according to the preset error correction mechanism is correctly received by the receiving terminal after last time the receiving terminal detects an error in receiving image frames sent by the transmitting terminal and before the receiving terminal sends the feedback message.

8. The image processing method of claim 1, wherein a combination of the first partial picture and the second partial picture constitutes a full picture.

9. The image processing method according to claim 1, wherein:
   the second subsequent image frame is one of a plurality of second subsequent image frames sent by the transmitting terminal that are correctly received;
   the second partial picture is one of a plurality of second partial pictures each belonging to one of the plurality of second subsequent image frames and being encoded by intra-frame encoding;

locations of the plurality of second partial pictures in the plurality of second subsequent image frames are different from each other and are different from the location of the first partial picture in the first subsequent image frame; and a combination of the first partial picture and the plurality of second partial pictures constitutes a full picture.

10. An image processing method comprising:

detecting whether a reception error has occurred to an image frame sent by a transmitting terminal;

in response to detecting the reception error, sending a reception-error message to the transmitting terminal, the reception-error message indicating the reception error of the image frame sent by the transmitting terminal receiving encoding data of a first subsequent image frame sent by the transmitting terminal, wherein: the encoding data of the first subsequent image frame is encoded according to a preset error correction mechanism; the encoding data of the first subsequent image frame includes at least intra-frame encoding data of a first partial picture of the first subsequent image frame; and the encoding data of the first subsequent image frame further includes inter-frame encoding data of a first remaining partial picture of the first subsequent image frame; and determining encoding data of a second subsequent image frame sent by the transmitting terminal is correctly received, the encoding data of the second subsequent image frame including intra-frame encoding data of a second partial picture of the second subsequent image frame and inter-frame encoding data of a second remaining partial picture of the second subsequent image frame, wherein a location of the first partial picture in the first subsequent image frame is different from a location of the second partial picture in the second subsequent image frame.

11. The image processing method according to claim 10, wherein sending the reception-error message to the transmitting terminal includes sending the reception-error message to the transmitting terminal in response to a preset time length having elapsed after detection of the reception error.

12. The image processing method according to claim 11, wherein the preset time length is constant or variable.

13. The image processing method according to claim 10, wherein sending the reception-error message to the transmitting terminal includes sending the reception-error message to the transmitting terminal in response to:
- a first preset time length having elapsed after detection of the reception error; and
- a second preset time length having elapsed after a most recent feedback message was sent to the transmitting terminal.

14. The image processing method according to claim 10, wherein sending the reception-error message to the transmitting terminal includes sending the reception-error message to the transmitting terminal in response to:
- the reception error being detected for a first time after a most recent feedback message was sent to the transmitting terminal; and
- a preset time length having elapsed after detection of the reception error.

\* \* \* \* \*